(12) United States Patent  
Iizuka et al.

(10) Patent No.: US 7,002,557 B2  
(45) Date of Patent: Feb. 21, 2006

(54) PORTABLE ELECTRONIC APPARATUS AND A DISPLAY CONTROL METHOD

(75) Inventors: Nobuo Iizuka, Hamura (JP); Takayuki Fukushima, Tokorozawa (JP); Kazuhisa Matsunaga, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 204 days.

(21) Appl. No.: 10/351,941

(22) Filed: Jan. 27, 2003

(65) Prior Publication Data

US 2003/0142081 A1    Jul. 31, 2003

(30) Foreign Application Priority Data

Jan. 30, 2002 (JP) .............................. 2002-021381
Jan. 10, 2003 (JP) .............................. 2003-004686

(51) Int. Cl.
 *G09G 5/00* (2006.01)
(52) U.S. Cl. ....................................................... 345/173
(58) Field of Classification Search ................ 345/684, 345/686, 688, 173, 174; 715/786, 787
 See application file for complete search history.

(56) References Cited

U.S. PATENT DOCUMENTS

| | | | | |
|---|---|---|---|---|
| 5,371,846 A | * | 12/1994 | Bates .......................... | 715/786 |
| 5,502,803 A | * | 3/1996 | Yoshida et al. .............. | 715/530 |
| 5,748,185 A | * | 5/1998 | Stephan et al. .............. | 345/173 |
| 5,889,236 A | * | 3/1999 | Gillespie et al. .......... | 178/18.01 |
| 5,943,044 A | * | 8/1999 | Martinelli et al. .......... | 345/174 |
| 5,943,052 A | * | 8/1999 | Allen et al. .................. | 715/787 |
| 6,043,809 A | * | 3/2000 | Holehan ...................... | 345/168 |
| 6,396,523 B1 | * | 5/2002 | Segal et al. .................. | 715/863 |
| 6,583,781 B1 | * | 6/2003 | Joshi et al. .................. | 345/156 |
| 6,707,449 B1 | * | 3/2004 | Hinckley et al. ........... | 345/173 |

FOREIGN PATENT DOCUMENTS

JP        11-203046        7/1999

* cited by examiner

*Primary Examiner*—Chanh Nguyen
(74) *Attorney, Agent, or Firm*—Frishauf, Holtz, Goodman & Chick, P.C.

(57) ABSTRACT

An electronic apparatus 20 is of a portable type and has a thin body integral with a display screen holdable by both hands HR, HL of a user for viewing purposes. Disposed on a front of the body 21 are a flat display panel 22 and various operation buttons 23–27, and first and second touch sensors 28 and 29. The first touch sensor 28 is disposed on the apparatus at a position where when the body 21 is held by both the hands of the user, a touch surface of the first sensor 28 is easily operated vertically by a finger of the user's right-hand HR whereas the second touch sensor 29 is disposed at a position where when the body 21 is held by both the hands of the user, its touch surface is easily operated horizontally by a finger of the user's left-hand HL.

14 Claims, 34 Drawing Sheets

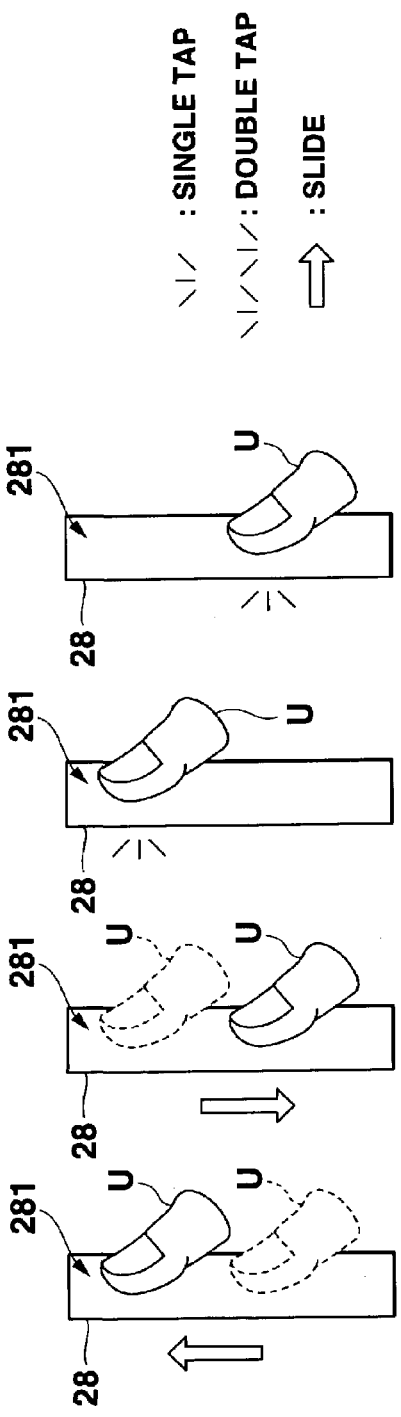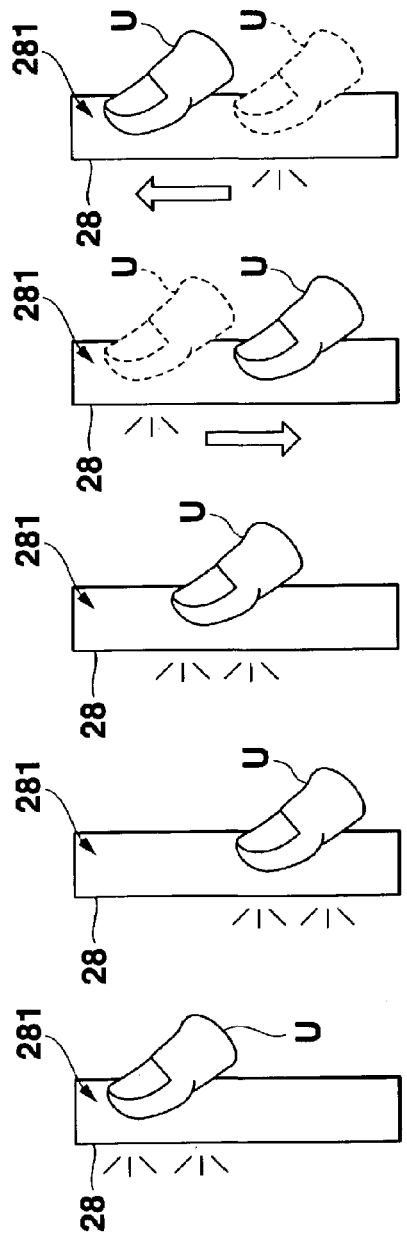

FIG.6A

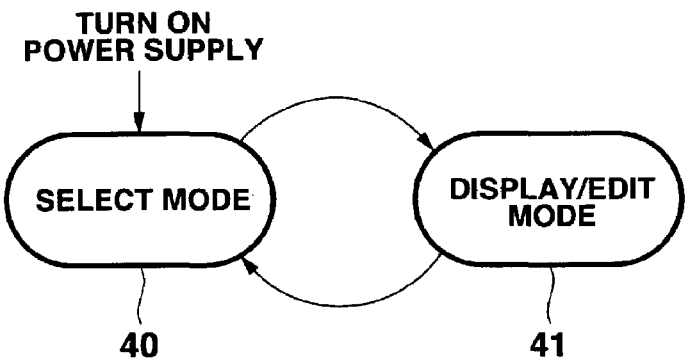

FIG.6B

| | No. | SENSED OPERATION PATTERN | OPERATION (PROCESS) TO WHICH THE OPERATION PATTERN SENSED IN DOCUMENT SELECT MODE 40 IS TO BE LINKED | OPERATION (PROCESS) TO WHICH THE OPERATION PATTERN SENSED IN DOCUMENT DISPLAY/EDIT MODE 41 IS TO BE LINKED |
|---|---|---|---|---|
| FIRST TOUCH SENSOR 28 | 1 | SLIDE OPERATION (UP) | UPPER ICON (ITEM) (IN THE CASE OF UPPERMOST ICON, PRECEDING ICON GROUP PAGE) | UP SCROLL |
| | 2 | SLIDE (DOWN) | LOWER ICON (ITEM) (IN THE CASE OF LOWERMOST ICON, A NEXT ICON GROUP PAGE) | DOWN SCROLL (IN A RANGE SELECTION, REVERSED DISPLAY IS INCLUDED) |
| | 3 | SINGLE TAP (ON UPPER PORTION) | PRECEDING ICON GROUP PAGE | PAGE (LINE) UP |
| | 4 | SINGLE TAP (ON MIDDLE PORTION) | MENU BAR DISPLAY | EDIT TOOL BAR DISPLAY |
| | 5 | SINGLE TAP (ON LOWER PORTION) | NEXT ICON GROUP PAGE | PAGE (LINE) DOWN |
| | 6 | DOUBLE TAP (ON THE UPPER PORTION) | SUPERORDINATE FOLDER | PAGE TOP |
| | 7 | DOUBLE TAP (ON MIDDLE PORTION) | SELECT/DISPLAY/EDIT MODE (IN THE CASE OF FOLDER ICON SUBORDINATE FOLDER) | SELECT/RELEASE (IN THE CASE OF RELEASE, SELECT MODE) |
| | 8 | DOUBLE TAP (ON LOWER PORTION) | WINDOW SWITCHING | PAGE END |
| | 9 | SINGLE TAP (ON UPPER PORTION) + SLIDE (DOWN) | ZERO PROCESS | DOWN SCROLL + REVERSED DISPLAY |
| | 10 | SINGLE TAP (ON LOWER PORTION) + SLIDE (UP) | ZERO PROCESS | UP SCROLL/ REVERSED DISPLAY |

FIG.7

| | No. | SECOND OPERATION PATTERN | OPERATION (PROCESS) TO WHICH THE OPERATION PATTERN SENSED IN DOCUMENT SELECT MODE 40 IS TO BE LINKED | OPERATION (PROCESS) TO WHICH THE OPERATION PATTERN SENSED IN DOCUMENT DISPLAY/EDIT MODE 41 IS TO BE LINKED |
|---|---|---|---|---|
| SECOND TOUCH SENSOR 28 | 11 | SLIDE (RIGHT) | RIGHT→LOWE ICON (IN THE CASE OF LOWERMOST ICON, NEXT ICON GROUP PAGE) | RIGHT SCROLL |
| | 12 | SLIDE (LEFT) | LEFT→UPPER ICON (IN THE CASE OF UPPERMOST ICON, PRECEDING ICON GROUP PAGE) | LEFT SCROLL |
| | 13 | SINGLE TAP (ON RIGHT PORTION) | RIGHT→LOWE ICON (IN THE CASE OF LOWERMOST ICON, NEXT ICON GROUP PAGE) | CURSOR RIGHT-SHIFT |
| | 14 | SINGLE TAP (ON MIDDLE PORTION) | MENU BAR DISPLAY | EDIT TOOL BAR DISPLAY |
| | 15 | SINGLE TAP (ON LEFT PORTION) | LEFT→UPPER ICON (IN THE CASE OF UPPERMOST ICON, PRECEDING ICON GROUP PAGE) | CURSOR LEFT-SHIFT |
| | 16 | DOUBLE TAP (ON LEFT PORTION) | SUPERORDINATE FOLDER | ZERO PROCESS |
| | 17 | DOUBLE TAP (ON MIDDLE PORTION) | SELECT/DISPLAY/ EDIT MODE | SELECT/RELEASE (IN THE CASE OF RELEASE, SELECT MODE) |
| | 18 | DOUBLE TAP (ON RIGHT PORTION) | SUBORDINATE FOLDER IN THE CASE OF FOLDER ICON | ZERO PROCESS |
| | 19 | SINGLE TAP (ON RIGHT PORTION) + SLIDE (LEFT) | ZERO PROCESS | REVERSED DISPLAY OF CURSOR SELECTED RANGE |
| | 20 | SINGLE TAP (ON LEFT PORTION) + SLIDE (RIGHT) | ZERO PROCESS | REVERSED DISPLAY OF CURSOR SELECTED RANGE |

FIG.8

| No. | SECOND OPERATION PATTERN (42k / 42l) | OPERATION (PROCESS) TO WHICH THE OPERATION PATTERN SENSED IN DOCUMENT SELECT MODE 40 IS TO BE LINKED (42m) | OPERATION (PROCESS) TO WHICH THE OPERATION PATTERN SENSED IN DOCUMENT DISPLAY/EDIT MODE 41 IS TO BE LINKED (42n) |
|---|---|---|---|
| 21 | SIMULTANEOUS SENSING OF SLIDE (DOWN) AND SLIDE (RIGHT) | ZERO PROCESS | ZOOM-IN |
| 22 | SIMULTANEOUS SENSING OF SLIDES (UP AND LEFT) | ZERO PROCESS | ZOOM-OUT |
| 23 | SIMULTANEOUS SENSING OF SLIDES (DOWN AND LEFT) | ZERO PROCESS | CLOCKWISE ROTATION OF DISPLAY SCREEN |
| 24 | SIMULTANEOUS SENSING OF SLIDES (UPWARD AND RIGHT) | ZERO PROCESS | COUNTERCLOCKWISE ROTATION OF DISPLAY SCREEN |

| MOVING DISTANCE | CODE COUNT |
|---|---|
| 1 | 1 |
| 2 | 2 |
| 3 | 3 |
| 4 | 4 |
| 5 | 5 |
| 6 | 6 |
| 10 | 10 |

| MOVING DISTANCE | CODE COUNT |
|---|---|
| 1 | 1 |
| 2 | 1 |
| 3 | 1 |
| 4 | 1 |
| 5 | 2 |
| 6 | 2 |
| 10 | 15 |

| MOVING DISTANCE | OLD CODE COUNT | NEW CODE COUNT |
|---|---|---|
| 1 | 1 | 1 |
| 2 | 2 | 1 |
| 3 | 3 | 1 |
| 4 | 4 | 4 |
| 5 | 5 | 5 |
| 6 | 6 | 7 |
| 10 | 10 | 15 |

PORTABLE ELECTRONIC APPARATUS AND A DISPLAY CONTROL METHOD

BACKGROUND OF THE INVENTION

1. Field of the Invention

The present invention relates to portable electronic apparatus.

2. Background Art

In electronic apparatus such as computers, various pointing devices have been used as input devices. A typical one of the pointing devices is, for example, a mouse that freely moves a cursor displayed on the display screen and performs a single or double clicks at the position of the cursor. Portable electronic apparatus have a "touch pad" or "touch screen" instead of the mouse (For example, Published Japanese Patent Application "H11-203046", pages 3and 4, FIG. 4).

The touch pads and touch screens have only a function to specify a coordinate position. In other words, they only substitute for the cursor-moving function of the mouse. Therefore, for example, in order to scroll up or down the displayed picture, parts to be used exclusively for scrolling purposes (a ring-like part rotatable by a finger, so-called "wheel") are needed to thereby increase the cost.

In the touch screen, the display can be damaged to thereby fail to provide a good visible picture.

A technique for adding a scrolling function to the existing touch pad by devising appropriate driver software have been considered. In this case, however, there are many problems with the user interface. Especially, when the portable electronic apparatus is held by both hands of the user, there still remains a problem of unhandiness as the pointing device.

It is therefore an object of the present invention to provide a user interface m a portable electronic apparatus which is handy to the user in a state where the portable electronic apparatus is held by both hands of the user and does not hinder perusing the picture displayed on the display screen of the electronic apparatus.

SUMMERY OF THE INVENTION

In order to achieve the above object, according to one aspect of the present invention there is provided a portable electronic apparatus comprising:

a display device;

a first touch sensor provided so as to extend vertically on the display device;

a second touch sensor provided so as to extend horizontally on the display device; and a memory having stored a plurality of touch patterns sensed by the first and second touch sensors and a plurality of display control programs for controlling the display device in a corresponding relationship.

According to one another aspect of the present invention there is provided in an electronic apparatus comprising a display device, a first touch sensor provided along a vertical side of the display device, and a second touch sensor provided along a horizontal side of the display device, a display control method comprising the step of:

controlling the display device depending on a respective one of a plurality of touch patterns to be sensed by the first and second touch sensors.

BRIEF DESCRIPTION OF THE DRAWINGS

FIGS. 5A–5I each illustrate a pattern of a touch to be performed on the first touch sensor;

FIG. 6A is a state diagram of an application program to be executed in the electronic apparatus, and FIG. 6B illustrates operation definition information for the first touch sensor;

FIG. 7 illustrates operation definition information for the second touch sensor;

FIG. 8 illustrates operation definition information for simultaneous sensing of two separate touch operations performed on the first and second touch sensors;

DETAILED DESCRIPTION OF THE PREFERRED EMBODIMENTS

Embodiments of the present invention will be described with reference to the accompanying drawings. Various specified details, examples, numerical values, character strings, and illustrated symbols to be used in the following description are only suggestions for clarifying the concept of the present invention. It is obvious that parts or all of them are not intended to limit the concept and scope of the present invention. Descriptions about the details of the well-known methods, processes, architectures and circuit constitutions (hereinafter refers to as "well-know matters") are omitted for simplifying purposes.

(First Embodiment)

Figure 1A:
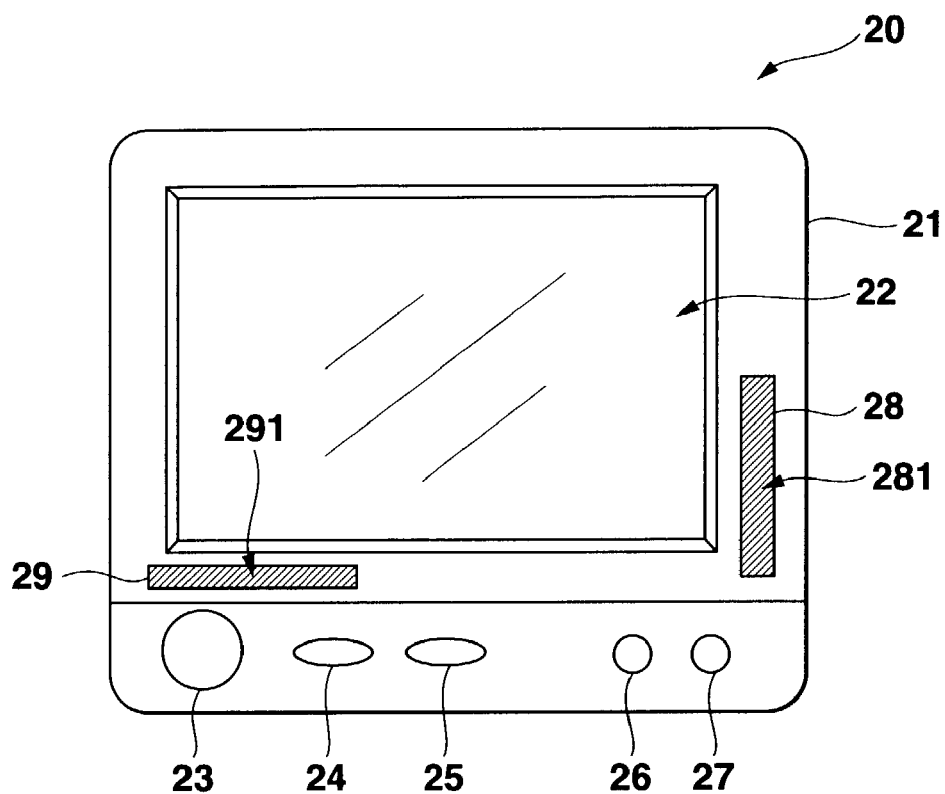
FIG. 1A is a front view of an electronic apparatus according to the present invention and FIG. 1B illustrates a manner in which the electronic apparatus is manipulated.
Figure 1B:
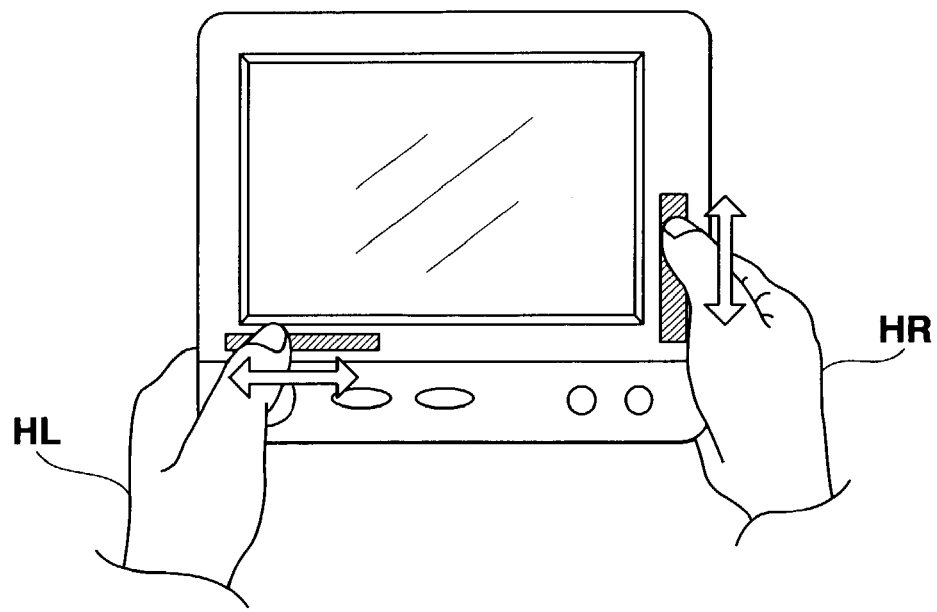

FIG. 1A is a front view of an electronic apparatus to which the present invention is applied. FIG. 1B shows a state in which the electronic apparatus is used. The electronic apparatus 20 has a portable thin body including a display screen integral therewith visible to a user while being held by both the hands HR, HL of the user. Disposed on a front of the device body 21 are a flat display panel 22 such as a LCD (Liquid Crystal Display) or an ELD (Electroluminescence Display), various operation buttons 23–27, a first touch sensor 28 and a second touch sensor 29 as elements unique to the present embodiment. The first and second touch sensors 28 and 29 have rectangular touch sensing sheets 281 and 291 on their fronts, respectively.

The first touch sensor 28 is preferably disposed at a position on the device front where when the device body 21 is held by both the hands of the user, the rectangular touch sheet 281 is easily manipulated vertically with a finger of the user's right hand HR (more particularly, when the device is held as shown, the user's thumb). In the example shown, the rectangular touch sheet 281 is preferably disposed so as to extend along the right side of the flat display panel 22. The second touch sensor 29 is preferably disposed at a position where when the device body 21 is held by both the hands of the user, the rectangular touch sheet 291 is easily manipulated horizontally with a finger of the left hand HL of the user (more particularly, when held as shown, the user's left thumb). That is; in the example shown, the rectangular touch sheet 291 is preferably disposed so as to extend along the lower side of the flat display panel 22.

The user can touch the rectangular touch sheets 281 and 291 with his or her right and left thumbs, respectively. Here, a single touch is hereinafter defined as a single tap operation. Successive touch operations (twice) performed in a predetermined time is hereinafter defined as a double tap operation. A slid operation to be performed on the touch sensor while touching it is hereinafter defined as a slide operation, and a combination of the single or double tap operation and a subsequent slide operation is hereinafter defined as a tap+slide operation.

Figure 2:
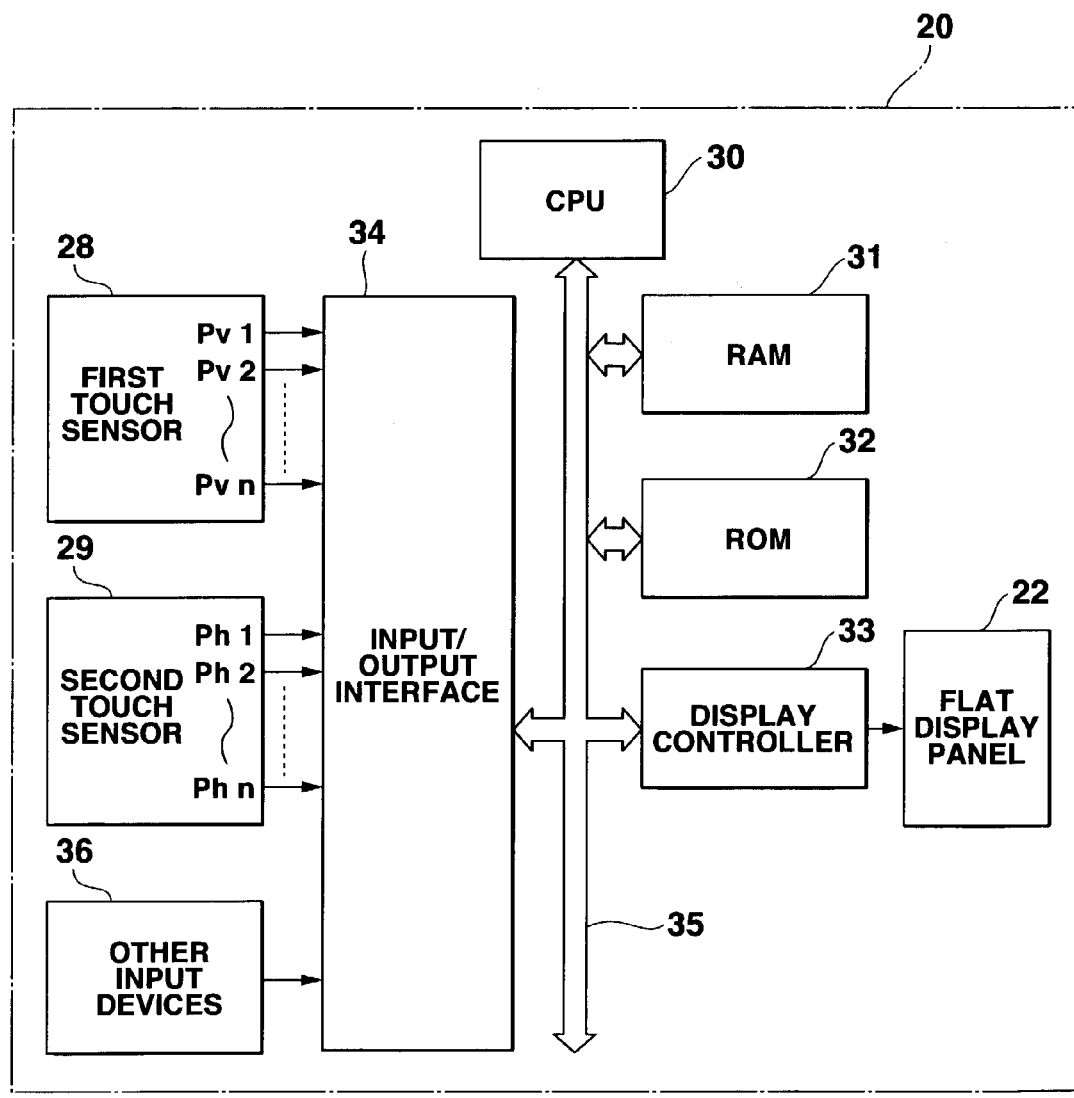
FIG. 2 is a block diagram of the electronic apparatus.

FIG. 2 is a schematic block diagram of the electronic apparatus 20. In FIG. 2, reference numeral 30 denotes a CPU that controls the various operations of the electronic apparatus 20; 31 a RAM that functions as a work memory for storage of data produced when the respective operations of the electronic apparatus 20 are performed by CPU 30; 32 a ROM that has stored various software to be executed by CPU 30; 33 a display controller; 34 an input/output interface; and 35 a bus.

CPU 30 loads on RAM 31 software resources (a basic program and various application programs) stored beforehand in ROM 32, executes the software resources. CPU 30 receives input signals from the first and second touch sensors 28 and 29, and other input devices 36 (various operation buttons 23-27) through an input/output interface 34, realizes various processing functions by combining hardware resources such as CPU 30 and the software resources, and controls the display of the flat display panel 22, for example, through the display controller 33 in accordance with results of the processing.

Figure 3A:
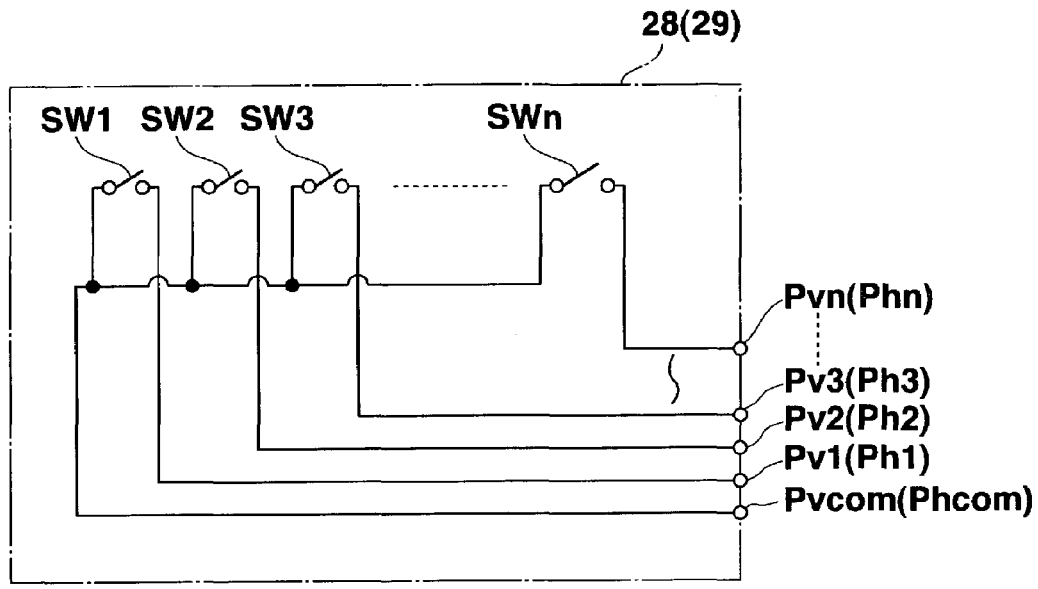
FIGS. 3A and 3B respectively show an electronic circuit and a mechanical structure that each of a first and a second touch sensor may have.
Figure 3B:
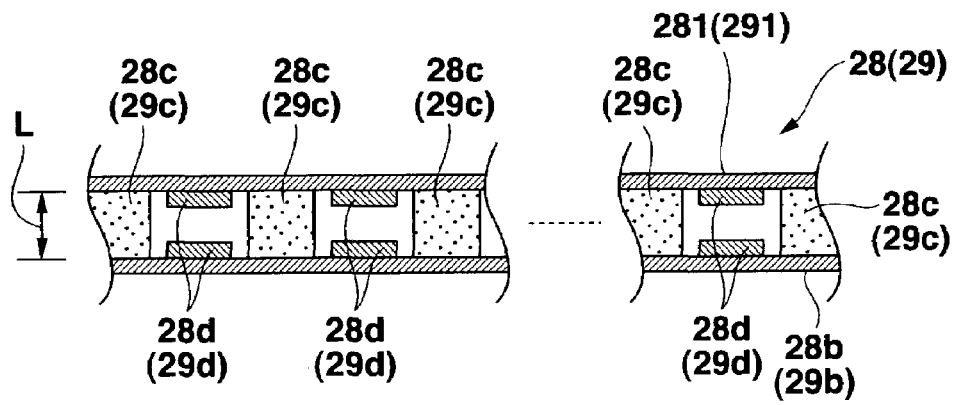

FIGS. 3A and 3B respectively show electrical and mechanical structures of each of the first and second touch sensors 28 and 29. As shown by the electronic circuit in FIG. 3A, the first touch sensor 28 includes n normally open switches SW1, SW2, SW3, . . . , and SWn with their fixed contacts connected to respective terminals Pv1, Pv2, Pv3, . . . , Pvn and with their movable contacts connected to a common terminal Pvcom.

Likewise, the second touch sensor 29 includes n normally open switches SW1, SW2, SW3, . . . , and SWn with their fixed contacts connected to respective terminals Ph1, Ph2, Ph3, . . . , Phn and their movable contacts connected to a common terminal Phcom.

Such circuit arrangement can be realized in various structures, of course. For example, they may include either an array of tact switches or a static-induction touch switch or may have a mechanical structure as shown in FIG. 3B. The first (second) touch sensor 28 (29) of FIG. 3B includes a pair of rectangular touch sheets 281 (291) and 28b (29b) of an insulation, a multiplicity of elastic spacers 28c (29c) arranged at certain intervals between the two touch sheets 281 (291), a multiplicity of pairs of contacts 28d (29d) with each pair of contacts disposed between adjacent elastic spacers 28c (29c) such that the respective contacts of each pair are attached to adjacent rectangular touch sheets 281 (291) and 28b (29b) and are spaced normally by a distance L equal to the thickness of the elastic spacers 28c (29c). When the rectangular touch sheet 281 (291) is pressed appropriately by the user, the elastic spacers are touched downward so that the contacts of each pair are brought into contact with each other. Each pair of contacts 28d (29d) corresponds to a respective one of switches SW1, SW2, SW3, . . . , SWn and an interval D at which the respective pairs of contacts are arranged is substantially equal to the thickness of the user's thumb.

Figure 3C:
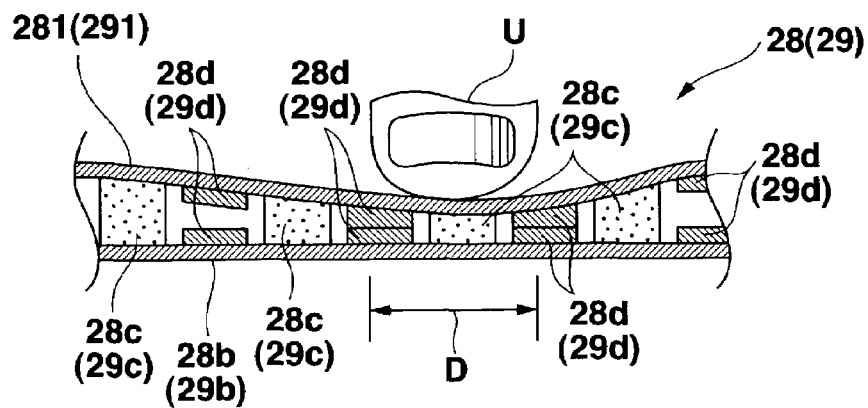
FIG. 3C illustrates operation of the each touch sensor having the mechanical structure.

According to this structure, when the upper rectangular touch sheet 281 (291) is pressed down at any position (for example, at any particular spacer) by the user's thumb, as shown in FIG. 3C, at least one pair of contacts 28d (29d) positioned in the vicinity of the spacer is dosed or turned on. Therefore, if a predetermined potential corresponding to a logic 1 is applied to the common terminal Pvcom (Phcom), logic 1 can be taken through the relevant at least one pair of dosed contacts 28d (switch SWi where i is 1, 2, 3, . . . n) from the corresponding terminal Pvi (Phi).

For simplifying purposes, it is assumed that the number of switches SWi is 5. It is also assumed that a signal to be taken from terminals Pv1 (Ph1)–Pv5 (Ph5) is represented by a signal string of 5 bits, and that signals taken from terminals Pv1 (Ph1) and Pv5 (Ph5) represent the most and least significant bits, respectively. When all the switches SW1–SW5 are open or off, a signal string of "00000" or all logic zeros is taken from terminals Pv1 (Ph1)–Pv5 (Ph5). When only the leftmost switch SW1 is on, a signal string of "10000" where only the most significant bit is logic 1 is taken from terminals Pv1 (Ph1)–Pv5 (Ph5).

Figure 4:
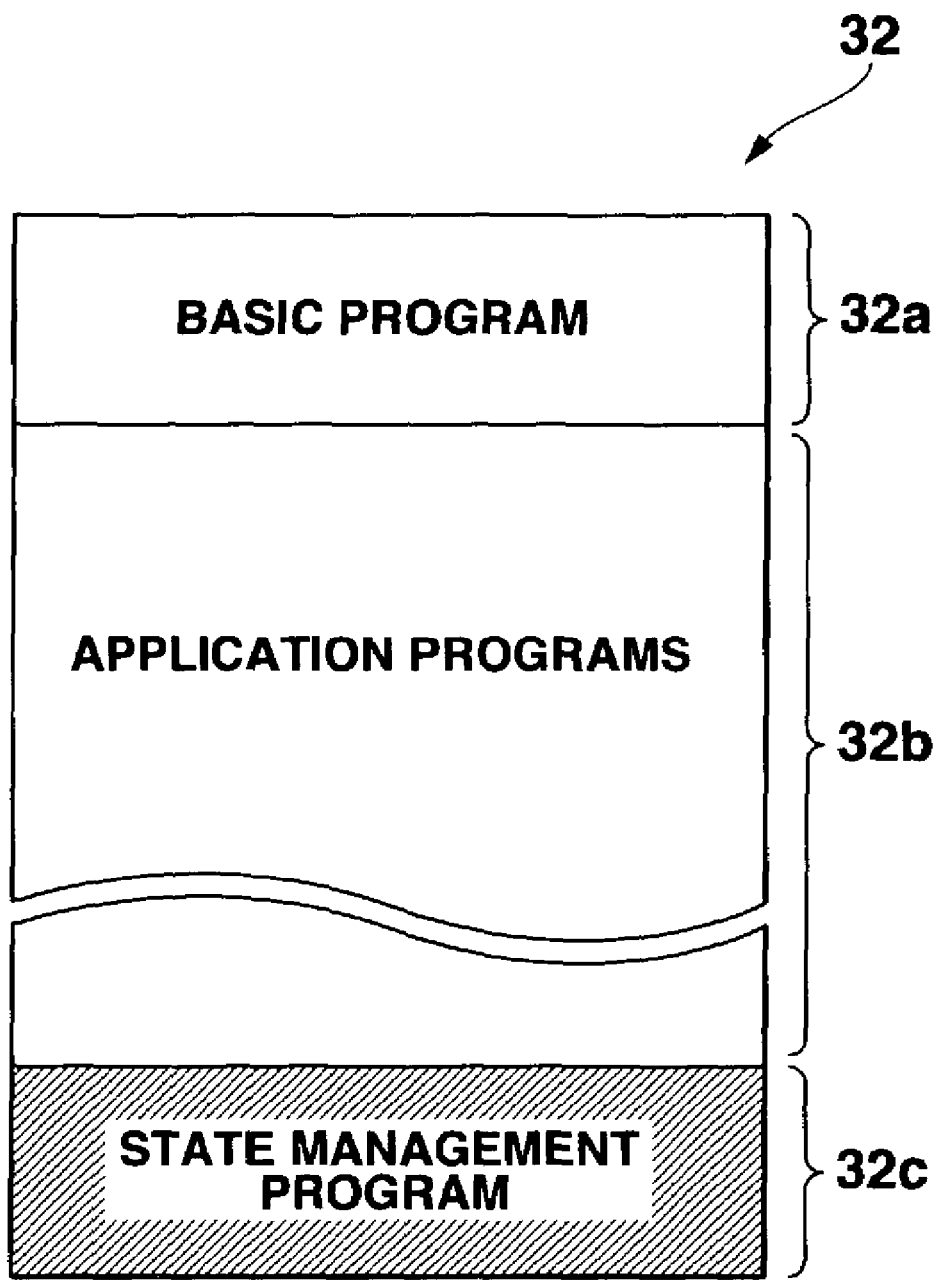
FIG. 4 schematically illustrates a memory map in ROM.

FIG. 4 schematically illustrates a structure of a memory map in ROM 32, which includes a storage area 32a for an operating system (basic program), a storage area 32b for application programs and a storage area 32c for a program that performs a process unique to the present embodiment hereinafter referred to as "state management program").

The "state management program" has stored classified information on "touch patterns that may be sensed " (FIGS. 6B, 7 and 8) on the first and second touch sensors 28 and 29, determines based on the classified information which classification a touch pattern produced by the user's actual touch operation belongs to, and performs a process for generating a command signal in accordance with a result of the determination. For example, in the case of an application program such as document display software, various processing procedures can be performed using the command signal. The actual details of the state management program will be described in more detail later.

The touch patterns will be described next. FIGS. 5A–5I illustrate classified "patterns of touches that may be performed intuitively" on the first touch sensor 28.

<Slide Operation>

The slide operation includes sliding the user's fingertip U upward and downward, respectively, on the touch sheet 281 while touching the touch sheet 281, as shown in FIGS. 5A and 5B. The "upward" and "downward" point to "toward" the upper and lower sides, respectively, of the flat display panel 22. This applies likewise to the second touch sensor 29 (not shown). The right and left slide operations point to sliding the user's finger tip U on the touch sheet 291 toward the right and left sides, respectively, of the display panel 22 while pressing the touch sheet 291.

<Single Tap Operation>

The single tap operation includes touching the rectangular touch sheet 281 only once in its upper and lower portions, respectively, as shown in FIGS. 5C and 5D. The upper and lower portions point respectively to an upper one third and a lower one third of the touch sheet 281. This applies to descriptions below.

In the case of the second touch sensor 29, the single tap operation includes touching the rectangular touch sheet 291 only once in its right or left portion. The right and left portions point respectively to a right one third and a left one third of the touch sheet 281. This also applies to descriptions below.

<Double Tap Operation>

The double tap operation includes touching the rectangular touch sheet 281 twice with the user's fingertip U in a predetermined time. FIGS. 5E, 5F and 5G illustrate double tap operations on the upper, middle and lower portions, respectively, of the touch sheet 281.

This applies likewise to the second touch sensor 29. The double tap operation includes touching on the right or left portion of the rectangular touch sheet 291 twice with the user's finger tip U in a predetermined time.

<Single Tap Operation+Slide Operation>

The single tap operation+slide operation includes touching the rectangular touch sheet 281 once with the user's finger tip U and then sliding his or her finger on the touch sheet 281. FIGS. 5H and 5I include performing a single tap operation on the upper portion of the rectangular touch sheet 281 and then a downward slide operation, and performing a single tap operation on the lower portion of the rectangular touch sheet 281 and then an upward slide operation, respectively. This applies similarly to the second touch sensor 29 (not shown).

A state of an application program and action defining information will be described next. FIG. 6A shows a state diagram in document display software as one of the application programs to be executed by the electronic apparatus 20. In this Figure, the electronic apparatus 20 should read the document display program based on the user's predetermined operations directly after the power supply is turned on, select a document select mode 40 to perform required processes, and shift the state of the program from the document select mode 40 to a document display/edit mode 41 and vice versa, using the respective operation patterns (FIGS. 5A–5I).

FIGS. 6B, 7 and 8 each illustrate a table of the classifications of the respective operation patterns and the corresponding action defining information stored beforehand in a storage area 32c of ROM 32 for the state management program.

In FIG. 6B, a first or left-end column 42a shows that the first touch sensor 28 is involved. A second column 42b is a field which has stored an ID No. of a touch pattern. A third column 42c is a field which has stored the touch pattern to be sensed. A fourth column 42d is a field which has stored information on an operation (process) to which the operation pattern sensed in the document select mode 40 is to be linked. A fifth column 42e is a field which has stored information on an operation (process) to which the operation pattern sensed in the document display/edit mode 41 is to be linked.

According to the table of FIG. 6B, sensing a No. 1 "slide operation (upward)" (FIG. 5A) is linked to "selection of an upper icon" (item) (in the case of the uppermost icon, the preceding icon group page) in the document select mode 40 and an "up scroll process" in the document display/edit mode 41. Sensing a No. 2 "slide operation (downward)" (FIG. 5B) is linked to "selection of a lower icon" item) in the document select mode 40 (in the case of the lowermost icon, a next icon group page) and a "down scroll process" in the document display/edit mode 41. The "item" in the document select mode 40 points to a desired operation to be performed, for example, when a menu bar is displayed, or a desired folder or file, for example, when a folder/file name is displayed instead of an icon. Sensing a No. 3 "single tap operation (on the upper portion)" (FIG. 5C) is linked to "selection of a preceding icon group page" in the document select mode 40 and "page (line) up movement in the document display/edit mode 41. Sensing a No. 4 "single tap operation (on the middle portion)" is linked to "selection of menu bar display" in the document select mode 40 and "edit tool bar display" in the document display/edit mode 41. Sensing a No. 5 "single tap process (on the lower portion)" (FIG. 5D) is linked to "selection of a next icon group display page" in the document select mode 40 and a "page (line) down process" in the document display/edit mode 41. Sensing of a No. 6 "double tap operation (on the upper portion)" (FIG. 5E) is linked to "selection of a superordinate folder" in the document select mode 40 and "selection of a page top" in the document display/edit mode 41. Sensing a No. 7 "double tap operation (on the middle portion)" (FIG. 5G) is linked to "selection of a select/display/edit mode" (in the case of a folder icon, a subordinate folder) in the document select mode and "select/release (in the case of "release", a select mode) in the document display/edit mode 41. Sensing a No. 8 "double tap operation (on. the lower portion)" (FIG. 5F) is linked to a "window switching process" in the document select mode 40 and "selection of page end" in the document display/edit mode 41. Sensing a No. 9 "single tap operation (on the upper portion)+slide operation (downward)" (FIG. 5H) is linked to a "zero process" in the select mode 40 and a "downward scroll/reversal display process in the document display/edit mode 41. Sensing a No. 10 "single tap operation (on the lower portion)+slide operation (upward)" (FIG. 5I) is linked to a "zero process" in the select mode 40 and an "upward scroll/reversed display process (in the case of select)" in the document display/edit mode 41.

In FIG. 7, a first or left-end column 42f defines sensing on the second touch sensor 29. A second column 42g is a field which has stored an ID No. of a touch pattern. A third column 42h is a field that has stored a touch pattern to be sensed. A fourth column 42i is a field which has stored information on an operation (process) to which the operation pattern sensed in the select mode 40 is to be linked. A fifth column 42j is a field which has stored information on an operation (process) to which the operation pattern sensed in the display/edit mode 41 is to be linked.

According to this table, sensing a No. 11 "slid operation" (rightward) is linked to "selection of right→a lower icon (in the case of the lowermost icon, a next icon group page)" in the select mode 40 and a "right scroll process" in the display/edit mode 41. Sensing a No. 12 "slide operation" (left) is linked to "selection of 43 left an upper icon (in the case of the uppermost icon, the preceding icon group page)" in the select mode 40 and a "left scroll process" in the display/edit mode 41. Sensing a No. 13 "single tap operation" (on the right portion) is linked to "selection of right→a lower icon (in the case of the lowermost icon, a next icon group page)" in the select mode 40 and a "cursor right-shift process" in the display/edit mode 41. Sensing a No. 14 "single tap process" (on the middle portion) is linked to "selection of menu bar display" in the select mode 40 and "edit tool bar display" in the display/edit mode 41. Sensing a No. 15 "single tap process" (on the left portion) is linked to "selection of left→an upper icon (in the case of the uppermost icon, the preceding icon group page)" in the select mode 40 and a "cursor left-shift process" in the display/edit mode 41. Sensing a No. 16 "double tap operation" (on the left portion) is linked to "selection of a supperordinate folder" in the select mode 40 and a "zero process" in the display/edit mode 41. Sensing a No. 17 "double tap operation" (on the middle portion) is linked to "selection of a select/display/edit mode" in the select mode 40 and a "select/release (in the case of release, the select mode)" in the display/edit mode 41. Sensing a No. 18 "double tap operation" (on the right portion) is linked to "selection of a subordinate folder "in the case of a folder icon" in the select mode 40 and a "zero process" in the display/edit mode 41. Sensing a No. 19 "single tap operation" (on the right portion)+slide operation (leftward) is linked to a "zero process" in the select mode 40 and "reversed display of a cursor selected range in the display/edit mode 41. Sensing a No. 20 "single tap operation" (on the left portion)+slide operation (rightward) is linked to a "zero process" in the select mode 40 and "reversed display of the cursor selected range in the display/edit mode 41.

In FIG. 8, simultaneous sensing of the first and second touch sensors 28 and 29 is defined. A first column 42k is a field that has stored an ID No. of a touch operation pattern. A second column 42l is a field that has stored a touch pattern to be sensed. A third column 42m is a field which has stored information on an operation (process) to which the operation pattern sensed in the select mode 40 is to be linked. A fourth 42n is a field which information on an operation (process) to which the operation pattern sensed in the display/edit mode 41 is to be linked.

According to this table, simultaneous sensing of a No. 21 "slide operation (downward) and slide operation (rightward)" is linked to a "zero process" in the select mode 40 and a "zoom-in process" in the display/edit mode 41. Simultaneous sensing of a No. 22 "slide operation (upward) and a "slide operation (leftward)" is linked to a "zero process" in the select mode 40 and a "zoom-out process" in the display/edit mode 41. Simultaneous sensing of a No. 23 "slide operation (downward) and a "slide operation (leftward)" is linked to a "zero process" in the select mode 40 and "clockwise rotation (of display screen)" in the display/edit mode 41. The simultaneous sensing of the No. 24 "slide operation (upward) and slide operation (rightward) is linked to a "zero process" in the select mode 40 and "counterclockwise rotation (of display screen)" in the display/edit mode 41.

An example of real operation using the "operation defining information" will be described next.

Figure 9A:
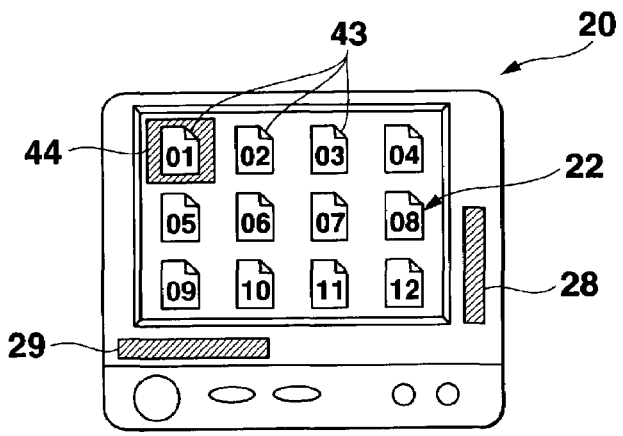
FIG. 9A illustrates a picture displayed on the display device of the apparatus when the first and second touch sensors are manipulated.
Figure 9B:
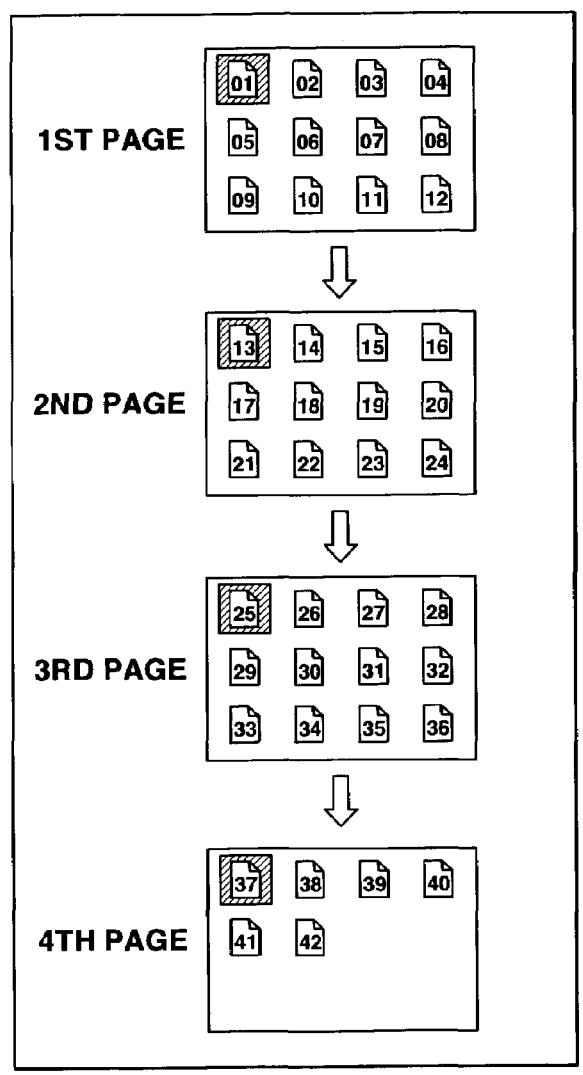
FIG. 9B illustrates a transition of the picture displayed on the display device as the first and second touch sensors are manipulated.

FIG. 9A schematically illustrates a picture displayed on the display screen obtained by manipulation on the first and second touch sensors 28 and 29. FIG. 9B shows sequential page selection performed on the displayed picture. In FIG. 9A, it is assumed that the electronic apparatus 20 is operating in the select mode 40 at present to thereby display a select picture on the flat display panel 22. The select picture includes n×m file icons 43 that are adapted to be displayed simultaneously on a single picture (hereinafter referred to as a page). If the total number of displayable file icons is x, the number of pages (select picture) corresponding to a quotient=x/(n×m) (if the quotient includes a fraction, an integer portion of the quotient+1) can be displayed. For example, when n=4, m =3 and x=43, 43/(4×3)=3.5833 . . . , which includes a fraction, so that 4 page select pictures in all, which corresponds to an integer portion (3) of the quotient+1, can be displayed.

In the initial state (select mode 40), a first-page select picture is displayed in which one of the file icons (for example, at an upper left corner) is a default select state. In FIG. 9A, a file icon 43 surrounded by hatching represents that this icon is selected at preset. The hatching corresponds to a cursor 44.

The example shows that a file number of two digits is displayed in each file icon 43 for convenience of illustration. As is done generally, a file name may be indicated under the file icon 43. Alternatively when any file icon 43 is placed in a selected state, a balloon chip may be displayed above the file icon 43 to display a file name, document information, property data, etc., therein.

If a 37th file icon 43, for example, is an object to be selected, this icon is positioned at an upper left corner of a 4th page, as shown in FIG. 9B. In order to select this file icon, pages should be turned over three times, starting with the first page (1st page→2nd page→3rd page→4th page). Most of the users who intend to perform such page turnover should perform a slide operation downward on the first touch sensor 28, a single tap operation on the lower portion of the first touch sensor 28, a continuous slide operation (rightward) on the second touch sensor 29 or a continuous single tap operation (on the fight portion) of the second touch sensor 29. This is because the slide operation causes the user to intuitively conjure the image of selective movement of the file icon or the single tap operation causes the user to intuitively conjure the image of page turnover.

In the case of the first touch sensor 28, the slide and single-tap operations are linked to "selection of a lower icon (item) (in the case of the lowermost icon, a next icon group page)" and "selection of a next icon group page", respectively, in the select mode 40 in the operation definition information (FIG. 6B). Therefore, when the slide operation (downward) is repeatedly performed on the first touch sensor 28, a selected file icon page is displayed correspondingly such that the icon moves to a next file icon group page to thereby select a target file icon (in this case, a file icon 43 at an upper left corner of page 4) finally. When a single tap operation is performed on the lower portion of the first touch sensor 28, a next file icon group page is displayed. When this single tap operation is iterated, a next file icon group page is correspondingly displayed sequentially until the target file icon (43 at an upper left corner on page 4) is selected finally.

If a double tap operation is sensed on the middle portion of the first or second touch sensor 28 or 29 in a state where the target file icon 43 is selected by sensing any one of the two operations just mentioned above, control shifts from the select mode 40 to the display/edit mode 41, which starts up an relevant application program to thereby cause the contents of a file corresponding to the selected fie icon to be displayed on the display panel 22.

Figure 10A:
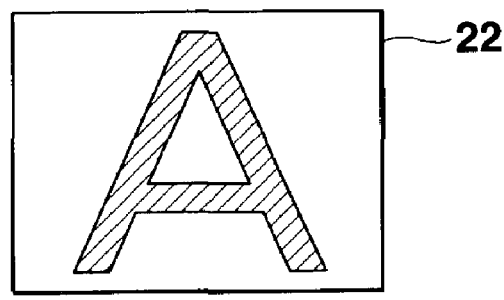
FIGS. 10A and 10B cooperate to illustrate enlargement of a part of the picture displayed on the display device.
Figure 10B:
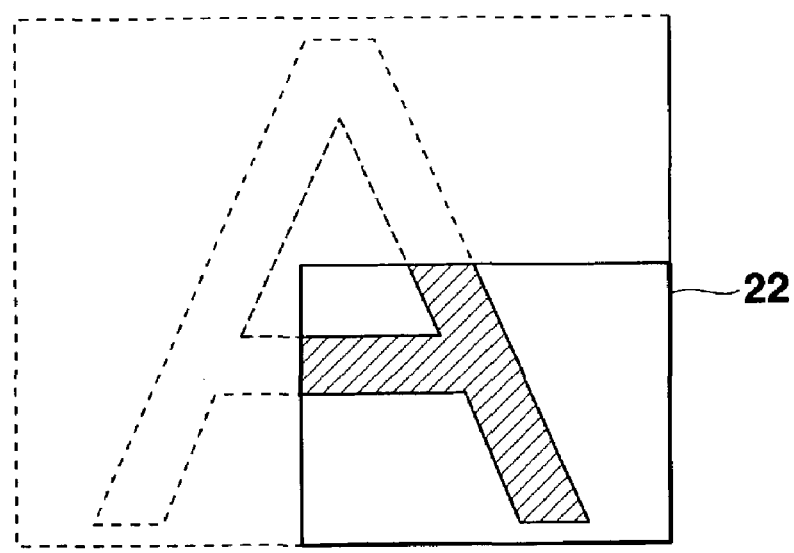

FIGS. 10A and 10B cooperate to illustrate enlargement of a displayed picture. FIG. 10A shows that a display screen of the display panel 22 displays, for example, an alphabetic letter "A". When the user intends to zoom in a part of the picture (or example, a right lower portion of "A"), the user simultaneously performs a slide operation (downward) on the first touch sensor 28 and a slide operation (rightward) on the second touch sensor 29, as shown by the descriptions related to No. 21 of FIG. 8. Although not shown, when the user intends to. conversely zoom out, the user simultaneously performs a slide operation (upward) on the first touch sensor 28 and a slide operation (leftward) on the second touch sensor 29, as shown by the descriptions related to No. 22 of table of FIG. 8.

When the user performs a slide operation (downward) on the first touch sensor 28 while performing the slide operation (leftward) on the second touch sensor 29, the displayed picture is rotated clockwise by an amount corresponding to a length of the sensed slide. Conversely, if the user performs a slide operation (upward) on the first touch sensor 28 while performing a slide operation (horizontal) on the second touch sensor 29, the displayed picture is rotated counter-clockwise by an amount corresponding to a length of the sensed slide, as shown by the descriptions related to No. 24 of table of FIG. 8. Thus, the user can intuitively conjure the image of the rotation of the displayed picture.

As described above, according to the present embodiment, when the user performs operation on the first and second touch sensors 28 and 29, it is determined which of the operation patterns (single tap, double tap, slide or a combination of selected ones of them) the operation corresponds to in the "operation defining information" (FIGS. 6B, 7 and 8). The corresponding operation is picked up from the "operation defining information" in accordance with a result of the determination and then executed in a relevant application.

Therefore, various patterns of a single tap operation, a double tap operation or a slide operation and a combination of selected ones of them can be sensed and the corresponding appropriate processes can be performed. Thus, this solves the subject of the invention described above to increase a degree of freely designing a user interface and the handiness of this device. Only by rewriting the "operation defining information" (FIGS. 6B, 7 and 8), this information may be applied to various application programs.

In addition, the first and second touch sensors 28 and 29 of this embodiment achieve correct sensing of the sliding direction of the user's finger, irrespective of its thickness, as will be described below.

Figure 11A:
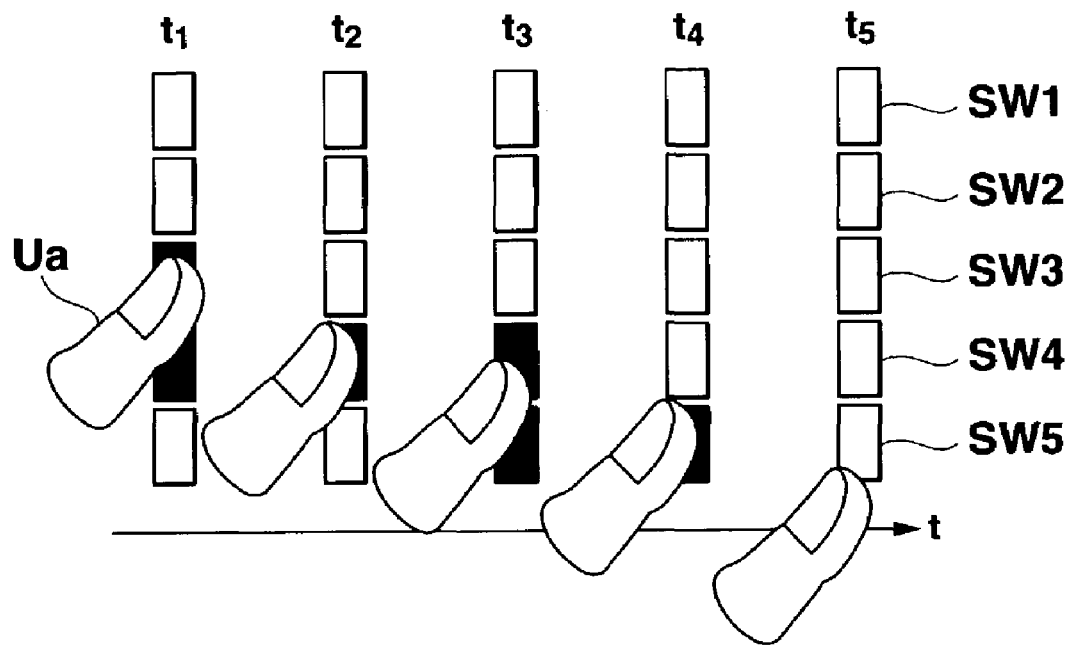
FIGS. 11A and 11B each schematically illustrate the relationship between a thickness of a user's finger which operates switches of the first touch sensor and intervals at which the switches are arranged.
Figure 11B:
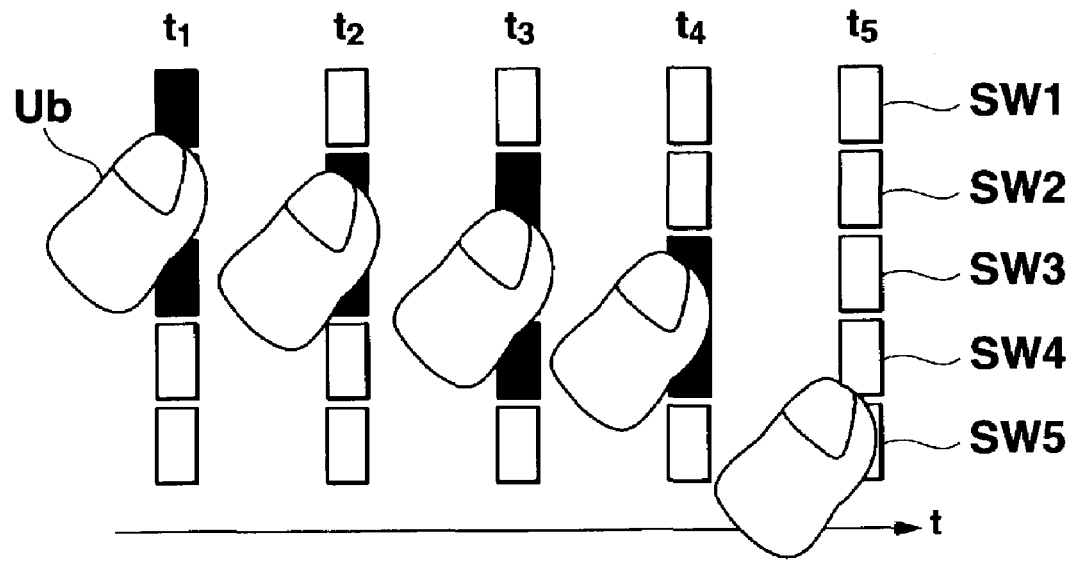

FIGS. 11A and 11B show how respective thinner and thicker fingers Ua and Ub (for example, of a child and an adult) operating on the first touch sensor 28 relate to intervals at which the respective switches of the first touch sensor 28 are arranged. A series of rectangular figures arranged in each vertical line represents switches where an outline rectangular figure represents a switch in an off state while a black rectangular figure represents a switch in an on state. In these Figures, it is assumed that five switches SW1–SW5 are arranged at equal intervals and that a downward slide operation is performed on the first touch sensor 28 from switch SW1 toward switch SW5). Even in the slide operation by any one of the fingers Ua and Ub, a combination of switches that will be turned on by the sliding operation changes in time series.

For example, in the case of the thinner finger Ua of FIG. 11A, only SW3 and SW4 are on at time $t_1$. If the state of the series arranged switches SW1–SW5 is represented by a signal string of 5 bits where it is assumed that the states of SW1 and SW5 represent the most and least significant bits, respectively, signal strings of "00110", "00010", "00011", "00001" and "00000" are obtained at times $t_1$, $t_2$, $t_3$, $t_4$ and $t_5$, respectively. From these signal strings, it is known that as time elapses, a logic change moves gradually toward the least significant bit. Therefore, the direction of the slide operation can be specified from the moving direction of the logical change.

In the case of the larger finger Ub, signal strings of "11100", "01100", "01110", "00110" and "00000" are obtained at times $t_1$, $t_2$, $t_3$, $t_4$ and $t_5$, respectively. As time elapses, the logical change shifts toward the lowermost bit in these signal strings. Thus, the direction of the slide operation can be correctly specified from the moving direction of the logical change, irrespective of the thickness of the user's finger.

If a quantity of finger slide on the rectangular touch sheet 281 of the first touch sensor 28 is set so as to coincide accurately or apparently with a quantity of actual scroll of the displayed image, a good sense of operation is obtained. For example, if the longer side of the rectangular touch sheet 281 of the first touch sensor 28 is 5 cm long and the picture size of the flat display panel 22 is 9 inches (the longer side of the displayed picture is about 9 cm long) at a VGA (Video Graphics Array) of 640×480 dots, the display picture is preferably adapted to scroll by a quantity (of 5 cm) equal to a quantity of slide through the entire length of the rectangular touch sheet 281. In the case of the VGA, the scroll quantity (of 5 cm) corresponds to a quantity of movement through 480×5/9=267 dots.

Figure 12:
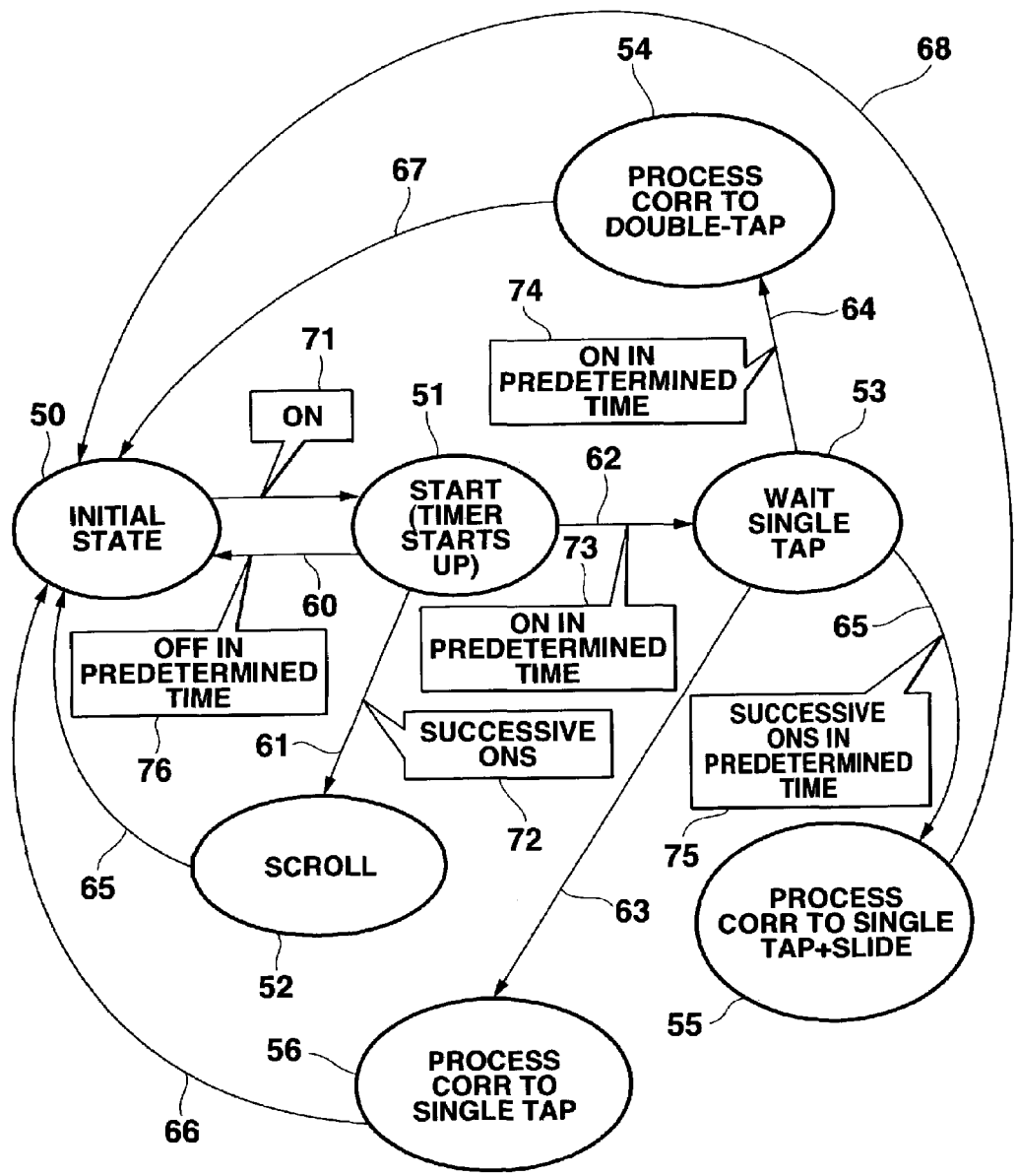
FIG. 12 illustrates a state of transition of a state management program.

The details of the state management program will be described next. FIG. 12 shows a transitional state of the state management program. In this Figure, each of states 50–56 is shown as encircled in an oval. An arrow connecting any two of the states represents a respective one of transitions 60–68. Balloon FIGS. 71–76 attached to the respective transitions 60–68 represent sensing conditions of the first and second touch sensors 28 and 29, which in turn represent the sensed states of switches SW1–SWn. The states 50–56 shown will be described as follows.

<State 50: Initial State>

The initial state refers to a picture wait state that continues to maintain a displayed picture, for example, when the screen saver is operating. In this picture wait state, it is determined whether "ON" has been sensed in any one of the switches SW1–SWn of the first or second touch sensor 28 or 29. If so, a state 51 (start (the timer starts)) is selected.

<State 51: Start>

In the state 51 (start (the timer starts)), it is determined which of a single "ON", successive "ONs" and no "ONs" were sensed in a predetermined time in the switches SW1–SWn. When "ONs" were successively sensed in the predetermined time, control shifts from the state 51 to a state 52 scroll operation). When a single "ON" was sensed, control shifts from the state 51 to a state 53 (single-tap wait). When no "ONs" are sensed in the predetermined time, control returns to the state 50.

<State 52: Scroll Operation>

In this state 52 (scroll operation), a scrolling process following the sensing of the slide operation is performed. As long as "ONs" are successively sensed in the predetermined time, the scroll operation is maintained When the state which "ONs" are successively sensed disappears, control returns to the state 50.

<State 53: Single Tap Wait>

In the state 53 (start (the timer starts)), it is determined which of a single "ON", successive "ONs" and no "ONs" were sensed in a predetermined time in the switches SW1–SWn. It is determined in the state 53 whether a single "ON" was sensed in any one of the switches SW1–SWn of the sensor 28 or 29 in the predetermined time or "ONs" were successively sensed in the switches SW1–SWn or no "ONs" were sensed even when the predetermined time was exceeded. When "ONs" is sensed once in the predetermined time, control shifts to a state 54 (a process corresponding to the double tap operation). When "ONs" were sensed successively in the predetermined time, control shifts to a state 55 (a process corresponding to the single tap operation+slide operation). When no "ONs" were sensed in the predetermined time, control shifts to a state 56 (a process corresponding to the single tap operation). When no "ONs" were sensed in the state 56, control returns to the state 50.

<State 54: A Process Corresponding to the Double Tap Operation>

In the state 54, a process corresponding to the double tap operation is executed and the state shifts to the state 50.

<State 55: Various Processes Corresponding to Sensing of the Single Tap Operation Sensing+Slide Operation>

In the state 55, a process corresponding to the single tap operation+ slide operation is executed. When "OFF" is sensed throughout in the predetermined time, or when no "ONs" are sensed in that time, control returns to the state 50.

In conclusion, this Figure shows that when some operation is performed on any one of the first and second touch sensors 28 and 29, control shifts to the state 51 to determine the sensed event. If "ONs" are successively sensed in the predetermined time, control shits to the state 52 to produce a scroll process. If a single "ON" is sensed, control shifts to the state 53 to determine a single tap operation. If no "ONs" are sensed in the predetermined time, control shifts from state 53 to state 56 in which a process corresponding to the single tap operation is performed. If "ON" is again sensed in the predetermined time, a process corresponding to the double tap operation is performed in a state 54. If "ONs" are successively sensed in the predetermined time, a process corresponding to the single tap operation+slide operation is performed in the state 55. Thus, all the processes corresponding to the single tap operation, double tap operation, scroll operation, and single tap operation+slide operation are performed.

(Event Sensing Process)

Figure 13:
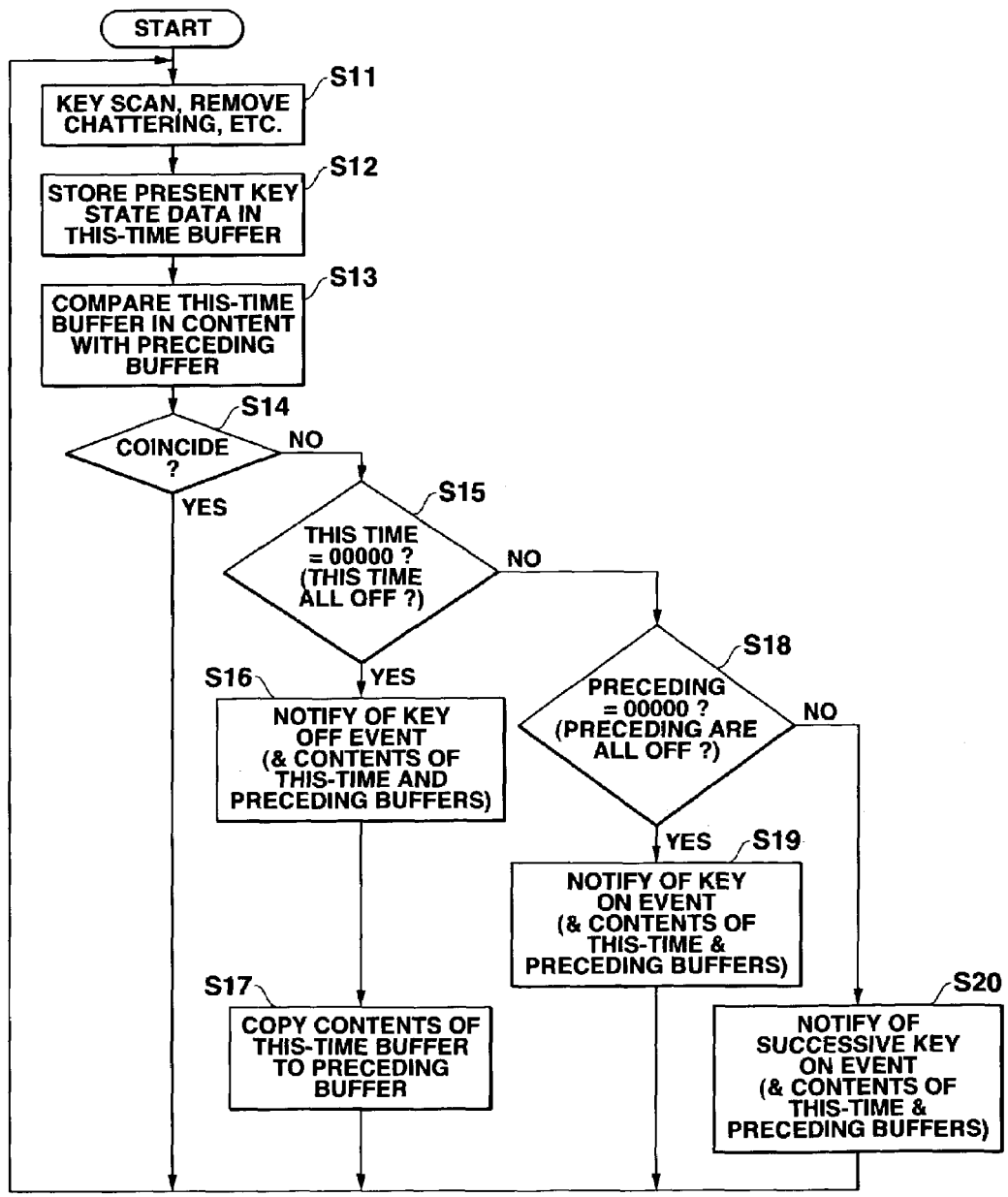
FIG. 13 is a flowchart of an event sensing process.

FIG. 13 is a flowchart of an event sensing process included in the state management program. In this flowchart, signal strings (of 5 bits described above) is taken from the first or second touch sensor 28 or 29 and shaped to filter out noise (chattering, etc) (step S11). The shaped signal string is then stored in a "this-time buffer" (step S12) and then the contents of the "this-time buffer" are compared to those of a "preceding buffer" (step S13). The "this-time buffer" and the "preceding buffer" each are a register or the corresponding storage element having a capacity for the number of bits of each signal string. The preceding buffer has saved the contents that the this-time buffer had last.

It is then determined at step S13 whether the contents of the this-time buffer coincide with those of the preceding buffer (step S14). If so, it is determined that there are no changes in the signal string from the first or second touch sensor 28 or 29 and that no operations were performed on the first and second touch sensors 28 and 29. Control then returns to step S11.

If a result of the determination at step S14 is negative, or the contents of the preceding buffer do not coincide with those of the this-time buffer, it is determined that some operation was performed on the first or second touch sensor 28 or 29 (or the operation stopped), and the following processes are then performed. First, it is determined whether the contents of the this-time buffer include all zeros ("00000") (step S15). If so, it is determined that the operation performed on the first or second touch sensor 28 or 29 includes moving the user's fingers away from the sensor 28 or 29 (that is, no operations were performed; OFF). In this case, CPU 30 is notified of the contents of the this-time and preceding buffers and a key-off event (step S16). The contents of the this-time buffer are then copied to the preceding buffer (step S17) and then control returns to step S11.

If a result of the determination at step S15 is negative, or if the contents of the this-time buffer are not all zeros, it is then determined whether the contents of the preceding buffer are all zeros (step S18). If so, the operation performed on the first or second sensor 28 or 29 includes a fingertip touch operation (ON). In this case, CPU 30 is notified of the contents of the this-time and preceding buffers and a key-on event (step S19). Control then returns to step S11. If a result of the determination at step A18 is negative (if the contents of the preceding buffer are not all zeros), the operation performed on the first or second sensor 28 or 29 includes a slide operation ("ONs" are successively sensed). In this case, CPU 30 is notified of the contents of the this-time and preceding buffers and successive sensing of "ONs" (step S20). Control then returns to step S11.

According to this event sensing process, the signal strings output from the first and second sensors 28 and 29 can be compared on the time base to sense a key-off event, a key-on event and a key successive-on event and CPU is then notified of the sensed data for performing a next process.

(Operation Process)

Figure 14:
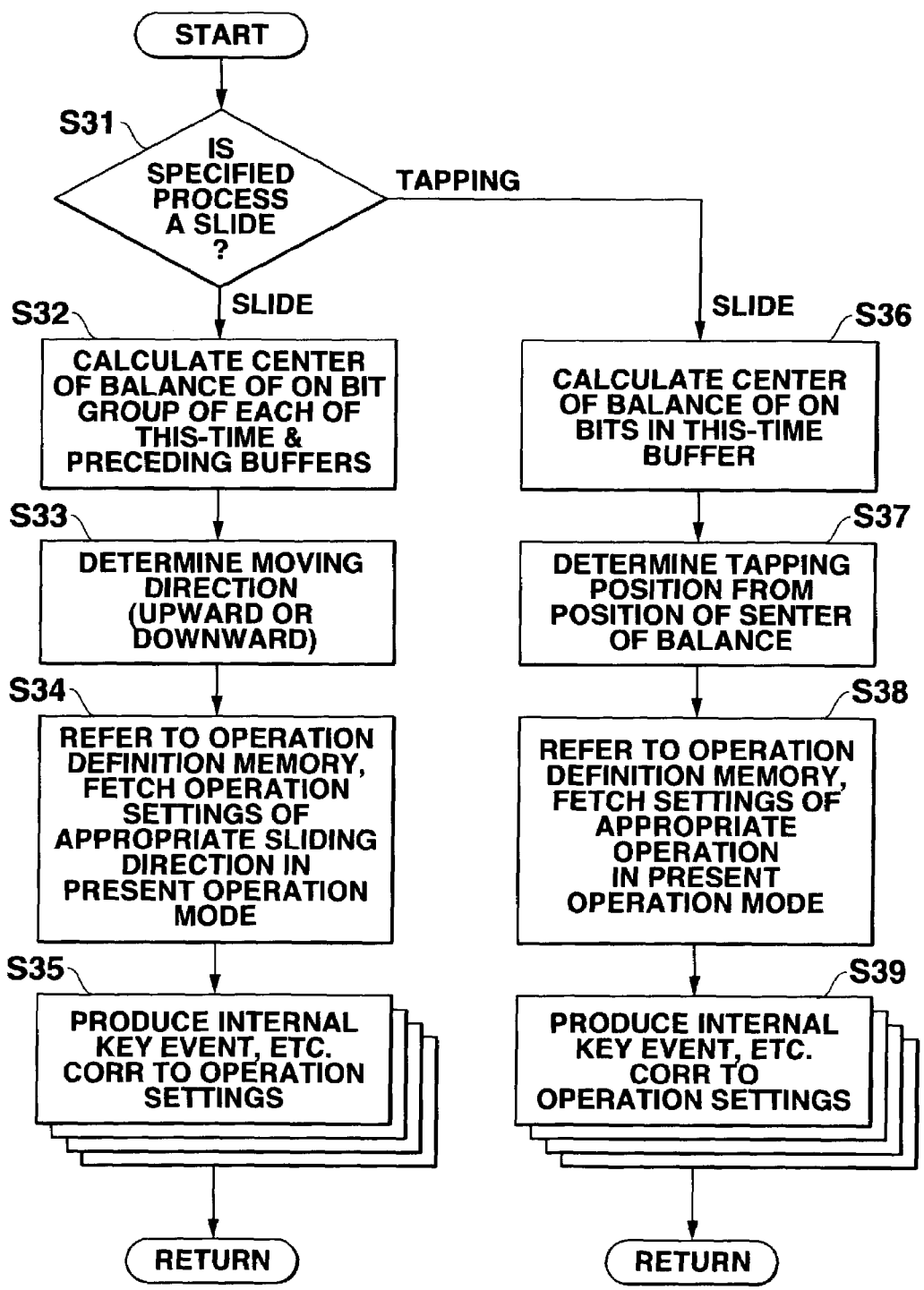
FIG. 14 is a flowchart of an operation process.

FIG. 14 is a flowchart of an operation process contained in the state management program. In this flowchart, it is first determined whether a specified process includes a slide (of which CPU 30 was notified from step S20 of FIG. 13) (step S31). If so, a center of balance of a logic 1 bit group in the contents of each of the this-time and preceding buffers is calculated as follows (step S32):

$$\text{Center of balance} = (\Sigma(\text{bit No.} \times \text{logic value}))/n \quad (1)$$

where n is the number of bits of a signal string.

If, for example, the contents of the this-time and preceding buffers are "00110" and "00010", respectively, the expression (1) is calculated as follows:

$$\text{Center of balance for the this-time buffer} = \quad (1\text{-}1)$$
$$(5 \times 0 + 4 \times 0 + 3 \times 1 + 2 \times 1 + 1 \times 0)/5 = 2.5$$

$$\text{Center of balance of preceding buffer} = \quad (1\text{-}2)$$
$$(5 \times 0 + 4 \times 0 + 3 \times 0 + 2 \times 1 + 1 \times 0)/5 = 2.0$$

Next, the moving direction of the slide is determined. by comparing the two centers of balance (step S33). It will be seen that the center of balance for the this-time buffer, "2.0" (bits), deviates downward by 0.5 bits from the center of balance for the preceding buffer, "2.0" (bits). Therefore, it is determined in this case that the downward slide was performed.

Then, referring to the operation defining information (FIGS. 6B, 7 and 8), operation settings in the appropriate slide direction in the present operation mode are fetched (step S34), and the corresponding internal key event, etc., are produced (or the corresponding internal processes are performed) (step S35). The program is then returned.

If the result of the determination at step S31 is negative, or if the specified process includes no slide operation, it is determined that the specified process includes a tap (single tap or double tap) operation. First, the center of balance for the this-time buffer is calculated in accordance with the expression (1) (step S36). The position of the tap operation is then determined from the position of the center of balance (step S37). The appropriate operation settings in the present operation mode are fetched by referring to the operation defining information (step S38). The corresponding internal key event, etc., are then produced (step S39) and the program is then returned.

According to this operation process, the center of balance of a signal string of n bits is calculated and the scrolling direction is specified from the moving direction of the center of balance. Therefore, the correct scrolling direction is sensed, for example, irrespective of the thickness of the user's finger. Also, in the determination of the tapping position the center of balance of a signal string of n bits is calculated and the tapping position is then determined from the moving direction of the center of balance. Therefore, the correct tapping position can be determined, irrespective of the thickness of the user's finger as well.

Figure 15:
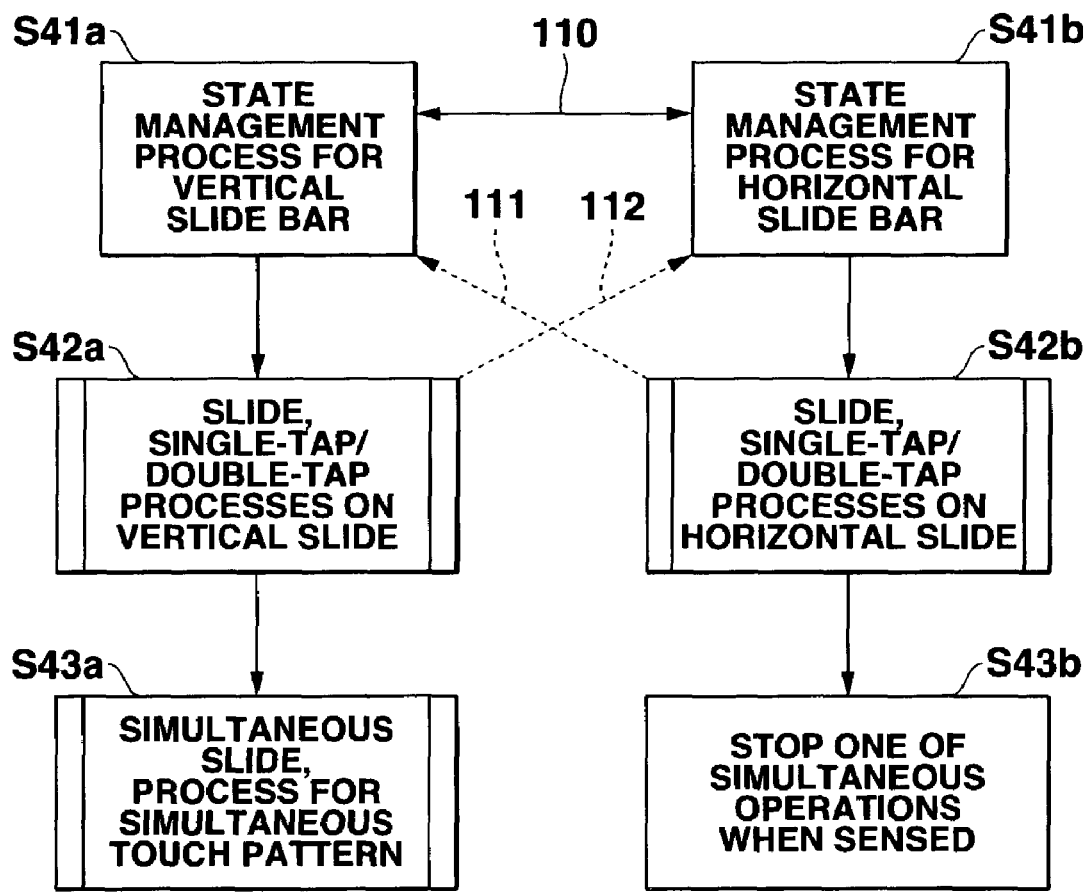
FIG. 15 is a flowchart of a state management program for executing in parallel processing routines of the first and second touch sensors.

FIG. 15 is a flowchart of a state management program that executes in parallel the processing routines of the first and second sensors 28 and 29. The features of the flowchart are that the processing routines of the first and second sensors 28 and 29 mutually monitor their respective results of processes. (See arrows 110–112).

According to this flowchart, when the vertical and horizontal state processes (steps S41*a* and 41*b*) of FIG. 12 are performed and respective event (such as a slide, a single tap or a double tap) processes are performed (steps S42*a*, 42*b*) in accordance with the respective results of those processes (steps S41*a* and S41*b*). At this time, if it is sensed that the vertical and horizontal slides are performed simultaneously, one of these processes can be stopped (step S43*b*) and any process, for example, including the above-mentioned enlarging process, reducing process or rotating process, corresponding to the simultaneous operation pattern may be performed (step S43*a*).

According to the electronic apparatus of the present invention, when an intuitive operation is performed on the first or second touch sensor by the user, the kind of the touch pattern is determined and a command signal produced as a result of the determination controls a state of display on the display screen of the electronic apparatus. Therefore, the electronic apparatus is capable of performing the conventional pointing operation/simple scroll operation, more complicated operations such as, for example, a combination of a single tap or double tap operation and a scroll operation to thereby realize various input functions. As a result, a user interface is provided which is handy to the user while being held by both hands of the user and causes no problems when the picture presented on the display screen is perused.

(Second Embodiment)

A second embodiment will be described next. The appearance and block diagram of an electronic apparatus 20 of the second embodiment and the structures of the first and second touch sensors 28 and 29 of the second embodiment are identical to those of the first embodiment shown in FIGS. 1–3, and further description and illustration thereof will be omitted.

Figure 16:
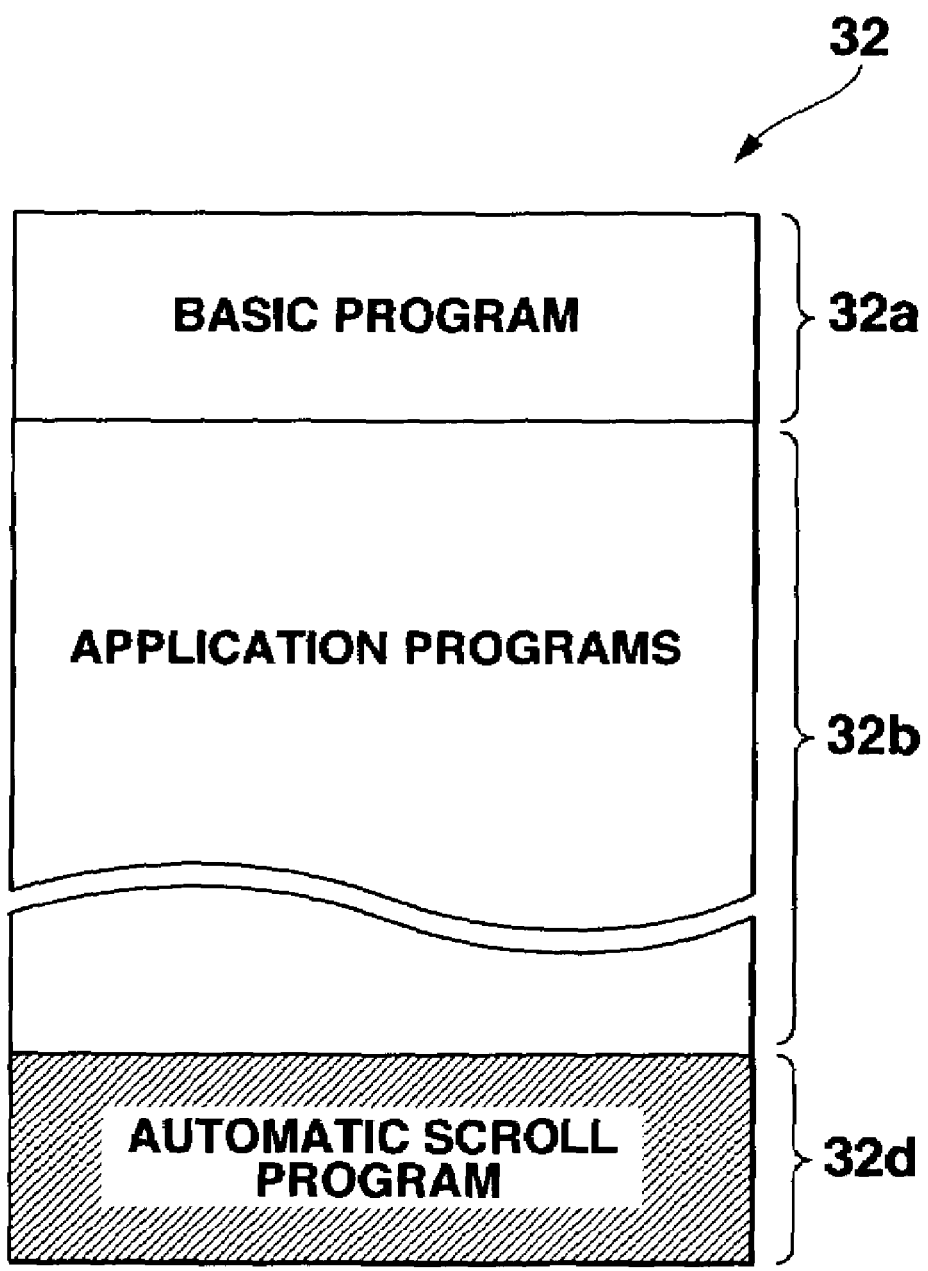
FIG. 16 is a schematic memory map of a ROM of an electronic apparatus in a second embodiment.

FIG. 16 schematically illustrates a memory map of ROM 32, which includes a storage area 32*a* for an operating system, a storage area 32*b* for application programs, and a storage area 32*d* for a program to realize processes unique to the second embodiment (hereinafter referred to as "automatic scroll program" for convenience of explanation).

Figure 17:
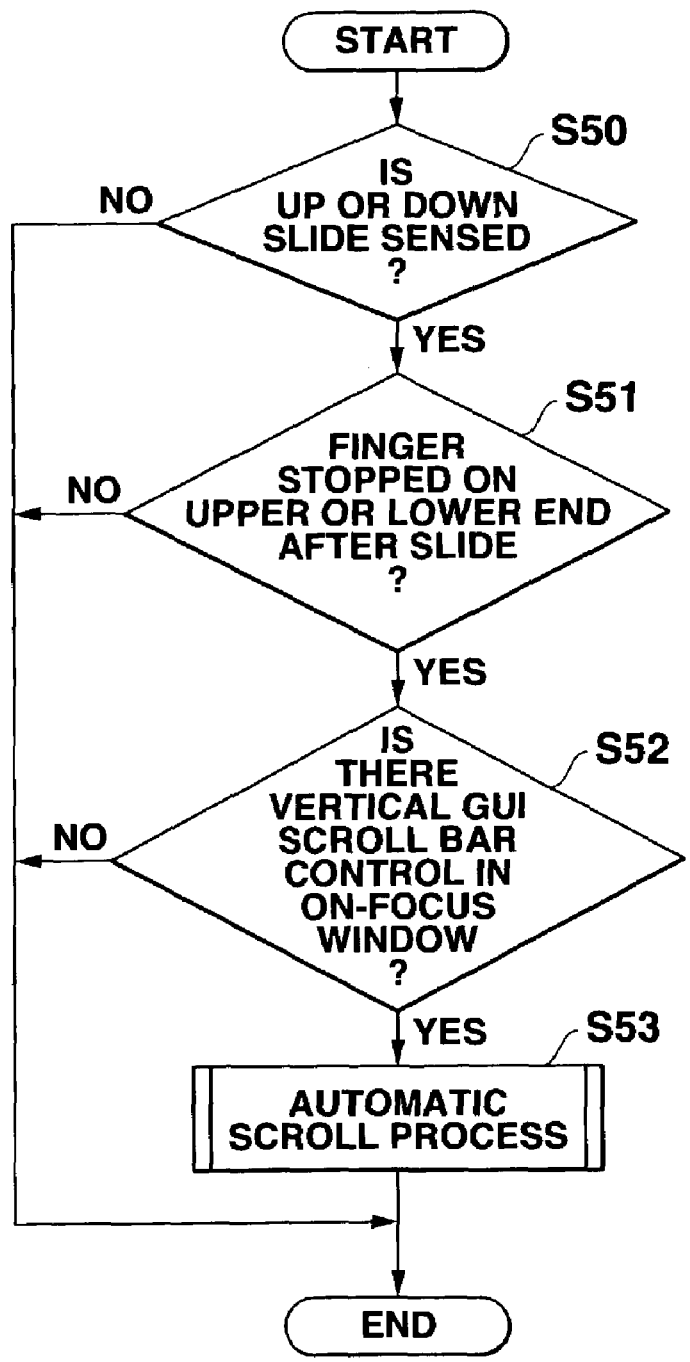
FIG. 17 is a schematic flowchart of an automatic scroll program.

FIG. 17 is a schematic flowchart of the automatic scroll program. A process represented by this flowchart is performed at predetermined intervals of time or in response to an interrupt corresponding to a touch on a rectangular touch sheet 281 of the first touch sensor 28. In this flowchart, it is first determined whether a downward or upward slide operation was sensed on the first touch sensor (the rectangular touch sheet 281) (step S50).

If so in step S50, "YES" is determined. If otherwise, or if the user's fingertip U does not touch the rectangular touch sheet 281 or if operation such as a single or double tap operation other than the slide operation is performed, "NO" is determined.

If determination in step S50 is "NO", the flowchart is closed. If the determination in step S50 is "YES", it is then determined whether the user's fingertip U has been stopped on the upper or lower portion of the rectangular touch sheet 281 after the slide operation (step S51). That is, if it is sensed that the user's fingertip U has been stopped on the upper or lower end portion of the rectangular touch sheet 281 after the upper or lower slide operation on the rectangular touch sheet 281, "YES" is determined. Conversely, if it is sensed that the user's fingertip U has moved away from the rectangular touch sheet 281 or stopped at a position on the rectangular touch sheet 281 except on its upper and lower end portions, "NO" is determined.

Figure 18A:
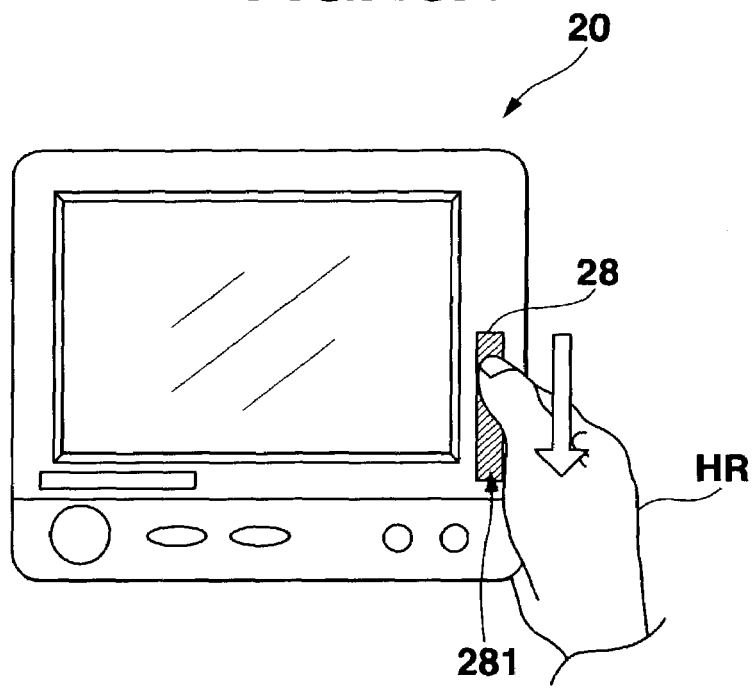
FIG. 18A illustrates a downward slide operation performed with a fingertip of a user's right hand on a rectangular touch sheet of a first touch sensor of the electronic apparatus according to the second embodiment.
Figure 18B:
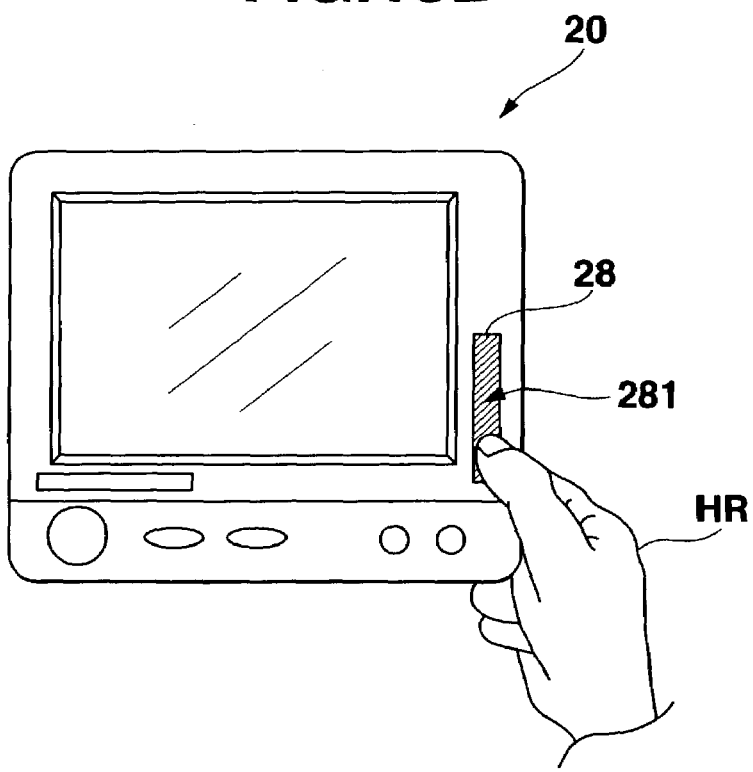
FIG. 18B illustrates the user's finger stopped on a lower end portion of the rectangular touch sheet 281 after the operation of FIG. 18A.

FIG. 18 shows that a state diagram obtained when the user performed a "downward" slide operation with a fingertip of his or her right hand HR on the rectangular touch sheet 281 and then stopped the fingertip on the "lower end" of the rectangular touch sheet 281. In such operation state, determination in both steps S50 and S51 becomes "YES". Also, when the user performed an "upward" slide operation with a fingertip of his or her right hand HR on the rectangular touch sheet 281 and then stopped the fingertip on the "upper end" of the rectangular touch sheet 281, determination in both steps S50 and S51 becomes "YES".

When the determination in step S51 is "NO", the flowchart is closed. If the determination in step S51 is "YES", it is then determined whether there is a "vertical GUI scroll bar control" in an on-focus window (step S52). The "on-focus window" is a term to be used in an operating system that supports a multiwindow and points to a window under operation at present among windows displayed on the flat display-panel 22. The "vertical GUI scroll bar control" is one of GUI control parts displayed in that window and used as a user interface to generally perform a vertical scroll.

Figure 19:
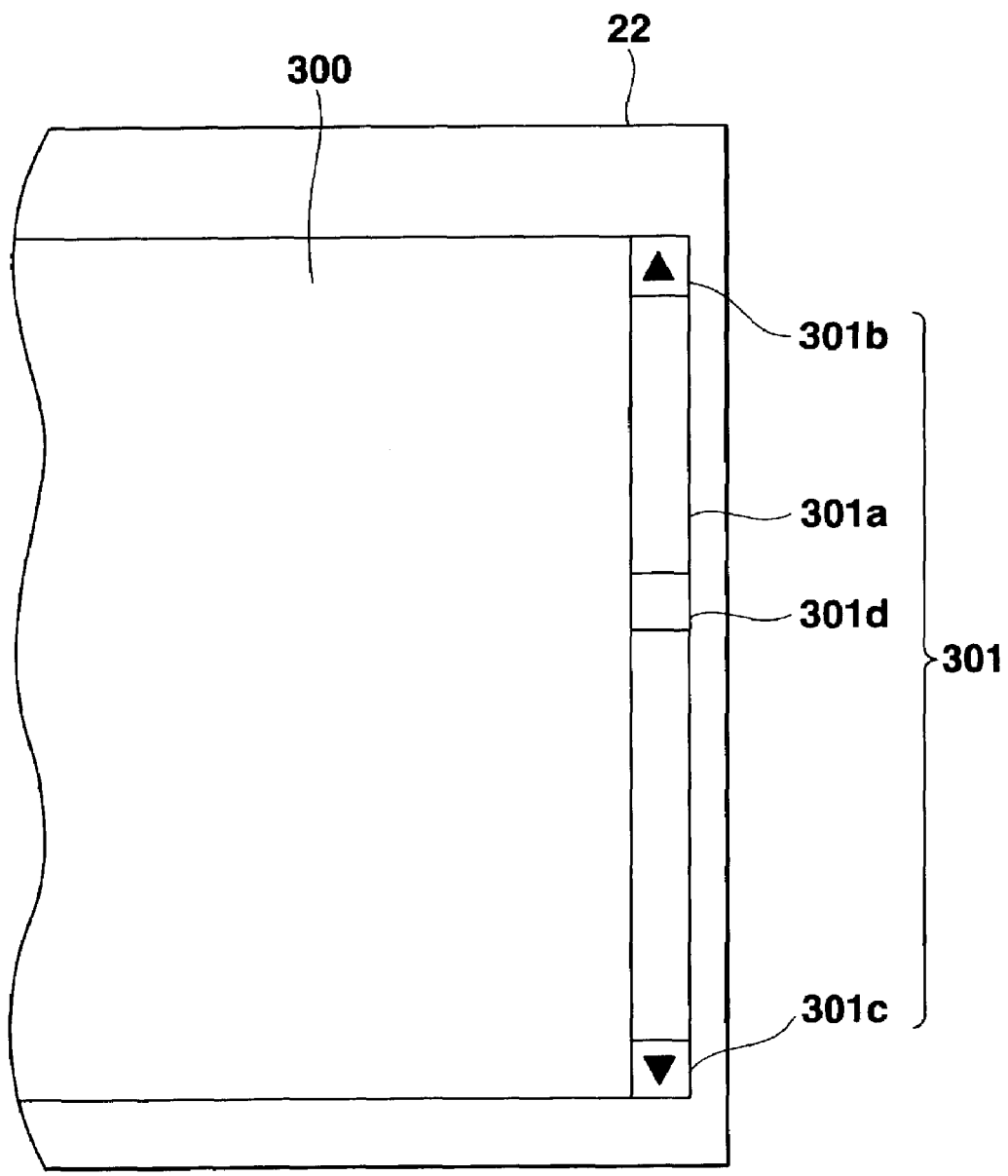
FIG. 19 illustrates a vertical GUI scroll bar control.

FIG. 19 shows a vertical GUI scroll bar control 301. In FIG. 19, the vertical GUI scroll bar control 301 is displayed along the side of the on-focus window 300 displayed on the panel 22. The vertical GUI scroll bar control 301 has therein a scroll box 301a, a scroll arrow 301b positioned at an upper end of the scroll box 301a, a scroll arrow 301c positioned at a lower end of the scroll box 301a, and a scroll thumb 301d movable along the length of the scroll box 301a.

When the scroll thumb 301d is moved vertically, an object (or example, a character string or an image) in the on-focus window 303 moves or scrolls in a direction reverse to the moving direction of the scroll thumb 301d The scroll thumb 301d may be moved by clicking the cursor on the scroll thumb 301d and then moving the scroll thumb with the cursor clicked or by clicking or continuing to touch the scroll arrow 301b positioned at the upper end of the scroll box 301a or the scroll arrow 301c positioned at the lower end of the scroll box 301c.

When the determination in step S52 is "NO", the flowchart is closed. If the determination in step S52 is "YES", that is, if the user's fingertip U remains on the upper or lower end of the rectangular touch sheet 281 after the finger's upper or lower slide operation was performed on the rectangular touch sheet 281, and there is the vertical GUI scroll bar control 301 on the on-focus window 300, the automatic scroll process is then performed (step S53).

Figure 20:
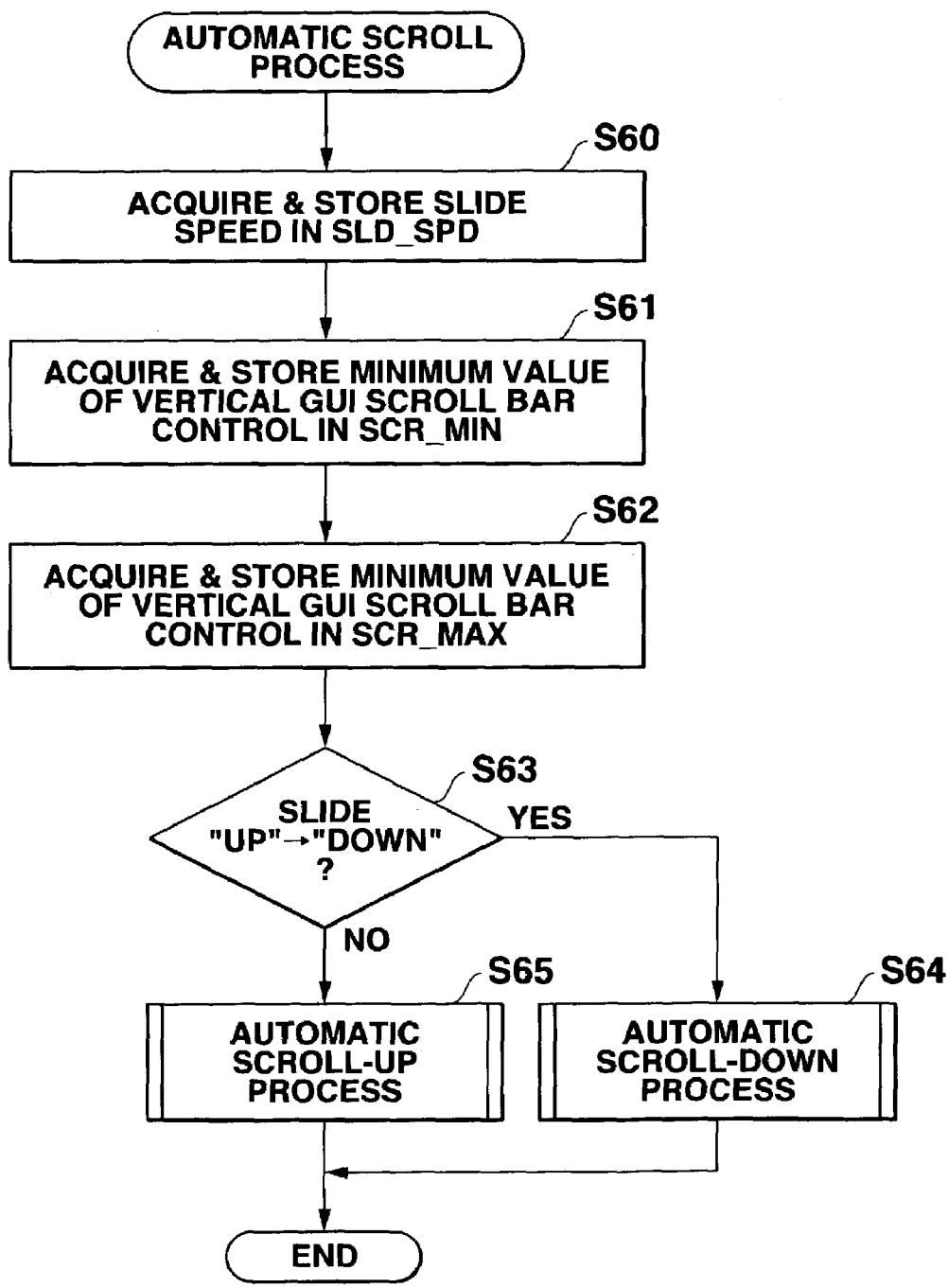
FIG. 20 illustrates a schematic flowchart of an automatic scroll process.

FIG. 20 is a schematic flowchart of the automatic scroll process. In this flowchart, the speed of the user's slide operation is obtained by detecting the slide operation, the speed is normalized and the resulting value is then stored in SLD_SPD (step S60). The "slide speed" is the speed of the upward or downward slide operation of the user's fingertip U on the rectangular touch sheet 281.

A minimum one of numerical values of the vertical GUI scroll bar control 301 displayed along the right side of the on-focus window 300 is then acquired and normalized and the resulting value is then stored in SCR_MIN (step S61). The "minimum value" of the vertical GUI scroll bar control 301 is obtained when the scroll thumb 301d is moved to the uppermost position in FIG. 19 (where the scroll thumb 301d is brought into contact with the scroll arrow 301b). The minimum value can be obtained by using a "Get Scroll Range Function", for example, in the case of an operating system in the Windows (R) series. The minimum value is settable to any value for each application. It is assumed in the description below that the minimum value is "SCR_MIN=0" for convenience's sake.

A maximum one of the numerical values of the vertical GUI scroll bar control 301 displayed on the on-focus window 300 is acquired and normalized and the resulting value is then stored in SCR_MAX (step S62). The "maximum value" of the vertical GUI scroll bar control 301 is obtained when the scroll thumb 301d is moved to the lowermost position where the scroll thumb 301d is brought into contact with the scroll arrow 301c. Also, this maximum value may be obtained, for example, by using the "Get Scroll Range Function", in the case of the operating system in the Windows (R) series This maximum value is settable to any value for each application, and it is assumed in the description below that "SCR_MAX=100" for convenience's sake.

The direction of the slide operation performed is then determined (step S63). This direction points to the direction of the upward or downward slide performed by the fingertip U on the rectangular touch sheet 281. When the downward slide operation is sensed, the determination in step S63 is "YES" and the automatic scroll-down process is performed (step S64). If otherwise, the determination in step S63 becomes "NO" and the automatic scroll-up process is performed (step S65).

Figure 21:
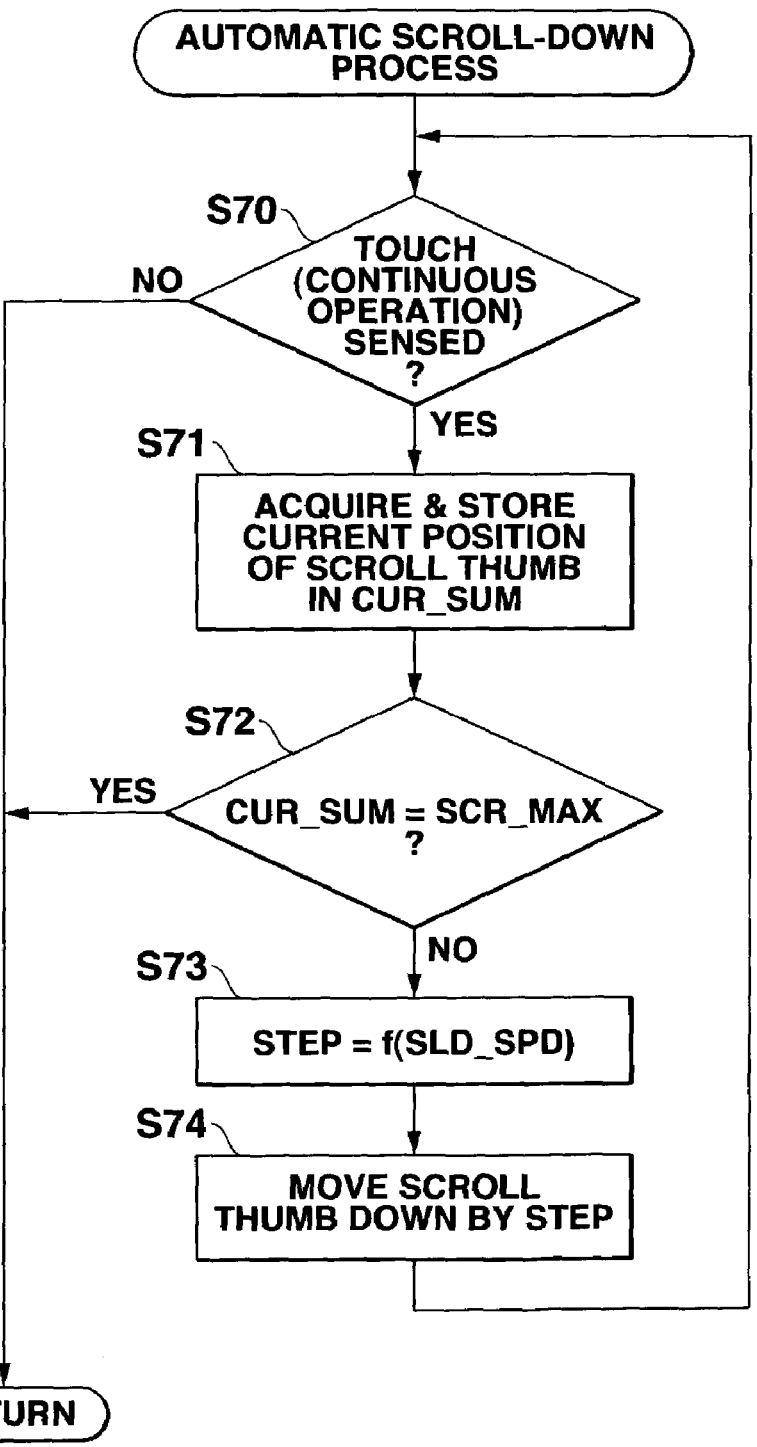
FIG. 21 is a schematic flowchart of an automatic scroll-down process.

FIG.21 is a schematic flowchart of the automatic scroll-down process. In this flowchart, it is first determined whether a continuous touch of the user's fingertip U on the rectangular touch sheet 281 is being sensed (step S70). If otherwise, the flowchart is closed. If the determination in step S70 is affirmative, the following looping operation is iterated.

The present value of the scroll thumb 301d of the vertical GUI scroll bar control 301 displayed on the on-focus window 300 is acquired, and normalized and the resulting value is then stored in CUR_SUM (step S71). The present value of the scroll thumb 301d may be acquired, for example, by using the "Get Scroll Pos Function" in the case of an operating system in the Windows (R) series.

It is then determined whether the value stored in CUR_SUM is equal to the SCR_MAX (step S72). If so ("YES"), it is determined that the position of the scroll thumb 301d has reached the maximum value. Thus, control exits the looping operation to close the flowchart. If both are different ("NO"), a value corresponding to the slide speed (SLD_SPD) is set in an automatic scroll step variable STEP (step S73), the present position of the scroll thumb 301d is moved downward by the set value STEP (step S74), and the steps S70–S74 are then iterated again.

Figure 22:
FIG. 22 shows a characteristic diagram indicative of a relationship between automatic scroll step value and slide speed.

FIG. 22 is a characteristic diagram indicative of a linear relationship present between automatic scroll step value STEP (vertical axis) and slide speed SLD_SPD Horizontal axis). The present invention, however, is not limited to this particular characteristic. The diagram may have a non-linear characteristic where STEP rapidly increases in a higher-speed area of SLD_SPD than in a lower speed area of SLD_SPD.

Figure 23:
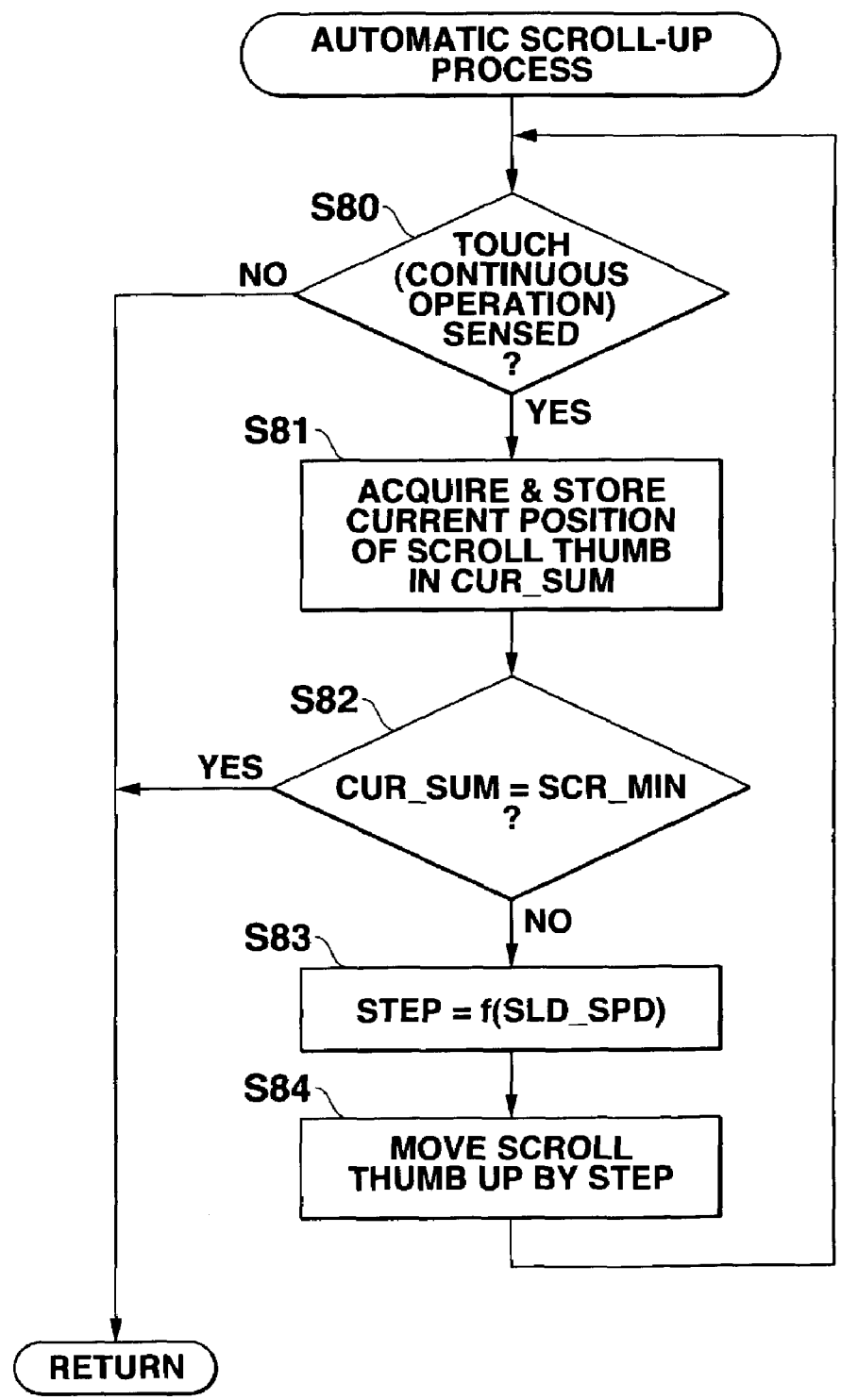
FIG. 23 is a schematic flowchart of an automatic scroll-up process.

FIG. 23 is a schematic flowchart of the automatic scroll-up process. In this flowchart, it is first determined whether a continuous touch of the user's fingertip U on the rectangular touch sheet 281 is being sensed (step S80). If otherwise, the flowchart is closed. If the determination in step S70 is affirmative, the following looping operation is iterated. The present value of the scroll thumb 301d of the vertical GUI scroll bar control 301 displayed on the on-focus window 300 is acquired, and normalized and the resulting value is then stored in CUR_SUM (step S81).

It is then determined whether the value stored in CUR_SUM is equal to the SCR_MIN (step S82). If so ("YES"), it is then determined that the position of the scroll thumb 301d has reached the minimum value. Thus, control exits the looping operation to dose the flowchart. If both are different ("NO"), a value corresponding to the slide speed (SLD_SPD) is set in the automatic scroll step variable STEP (step S83), the scroll thumb 301d is moved upward by the set STEP (step S84), and the steps S80–S84 are then iterated again.

Therefore, according to these two loops (of steps S70–S74 of FIG. 21 and steps S80–S84 of FIG. 23, respectively), if a downward or upward slide operation is performed at any speed (SLD_PD) on the rectangular touch sheet 281 and then the lower or upper end of the rectangular touch sheet 281 is simply touched with the user's fingertip U, the scroll thumb 301d is moved automatically downward or upward by a quantity (STEP) corresponding to the slide speed (SLD_SPD) at a time. As a result, an automatic scroll operation of objects such as character strings, images, etc., displayed on the on-focus window 300 is realized.

Figure 24:
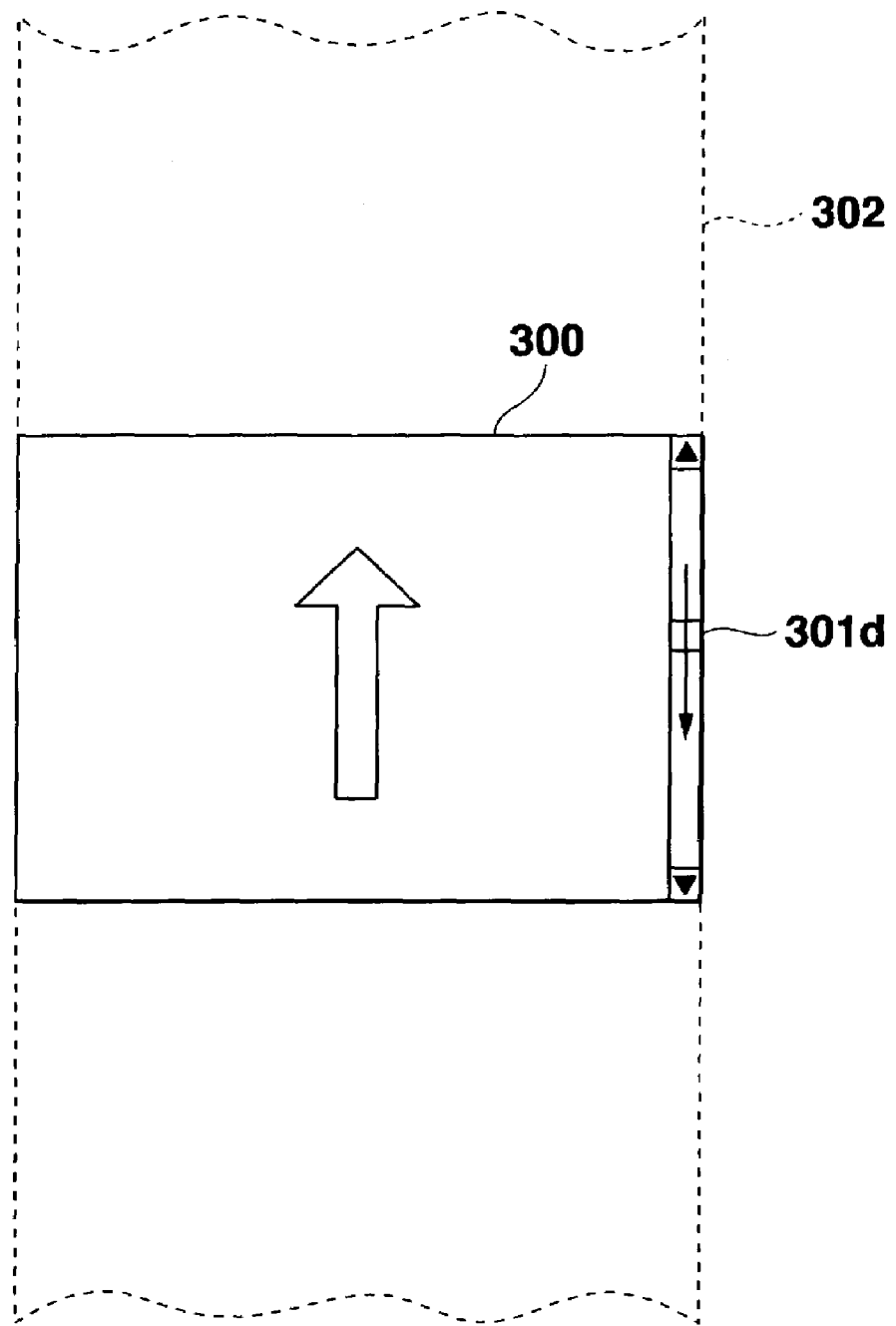
FIG. 24 illustrates one example of an automatic scroll operation.

FIG. 24 illustrates one example of the automatic scroll operation, which shows that the scroll thumb 301d moves downward and the objects including character strings, images, etc., displayed on the on-focus window 300 scroll upward in conjunction with the downward movement of the scroll thumb 301d The user's operation required to perform such automatic scroll operation is achieved by causing the rectangular touch sheet 281 to slide downward at any speed (SLD_SPD) with the user' fingertip U and then leaving the fingertip U touched on the lower end of the rectangular touch sheet 281.

As will be obvious from the above, the automatic scroll operation is achieved, using the rectangular touch sheet 281 provided on the electronic apparatus 20 in the present embodiment.

(Third Embodiment)

A third embodiment will be described next. The appearance and block diagram of an electronic apparatus 20 of the third embodiment and the structures of the first and second touch sensors 28 and 29 of the third embodiment are identical to those of the first embodiment shown in FIGS. 1–3, as in the second embodiment, and further description and illustration thereof will be omitted.

Figure 25:
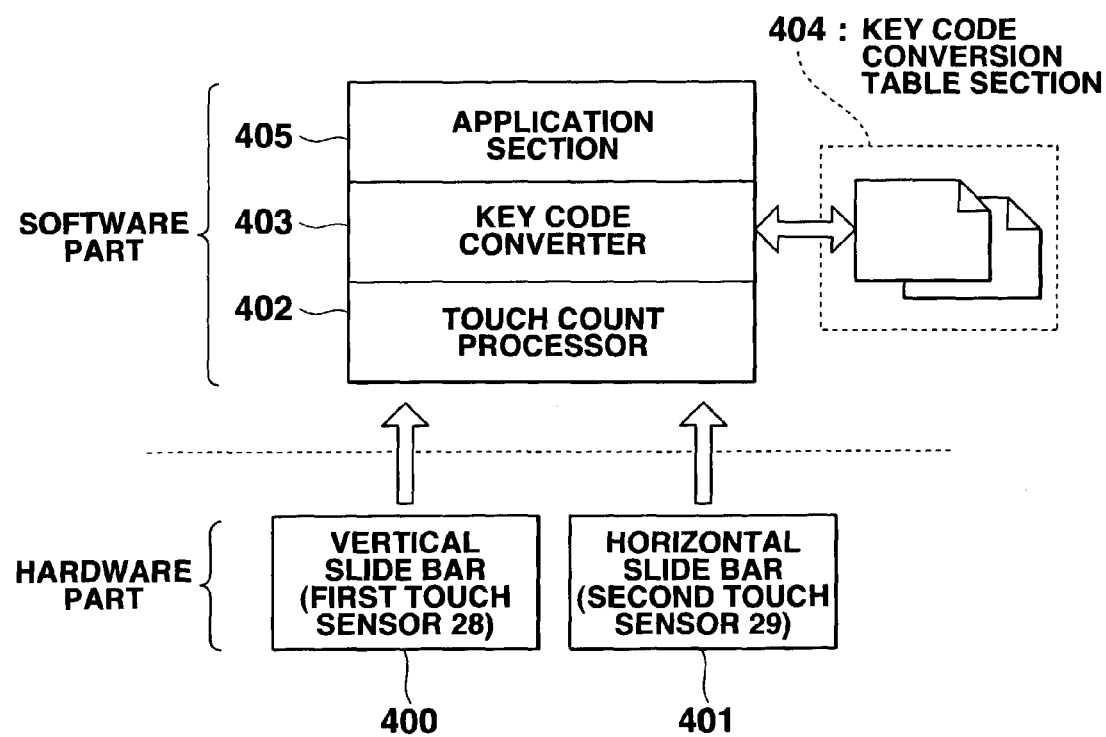
FIG. 25 illustrates a composition of a third embodiment.

FIG. 25 is a block diagram of the embodiment that includes in a hardware part a vertical slide bar 400 (corresponding to the first touch sensor 28) and a horizontal slide bar 401 (corresponding to the second touch sensor 29), a touch count processor 402, a key code converter 403, a key code conversion table 404 and an application section 405 formed in a software part in a superordinate layer.

Figure 26:
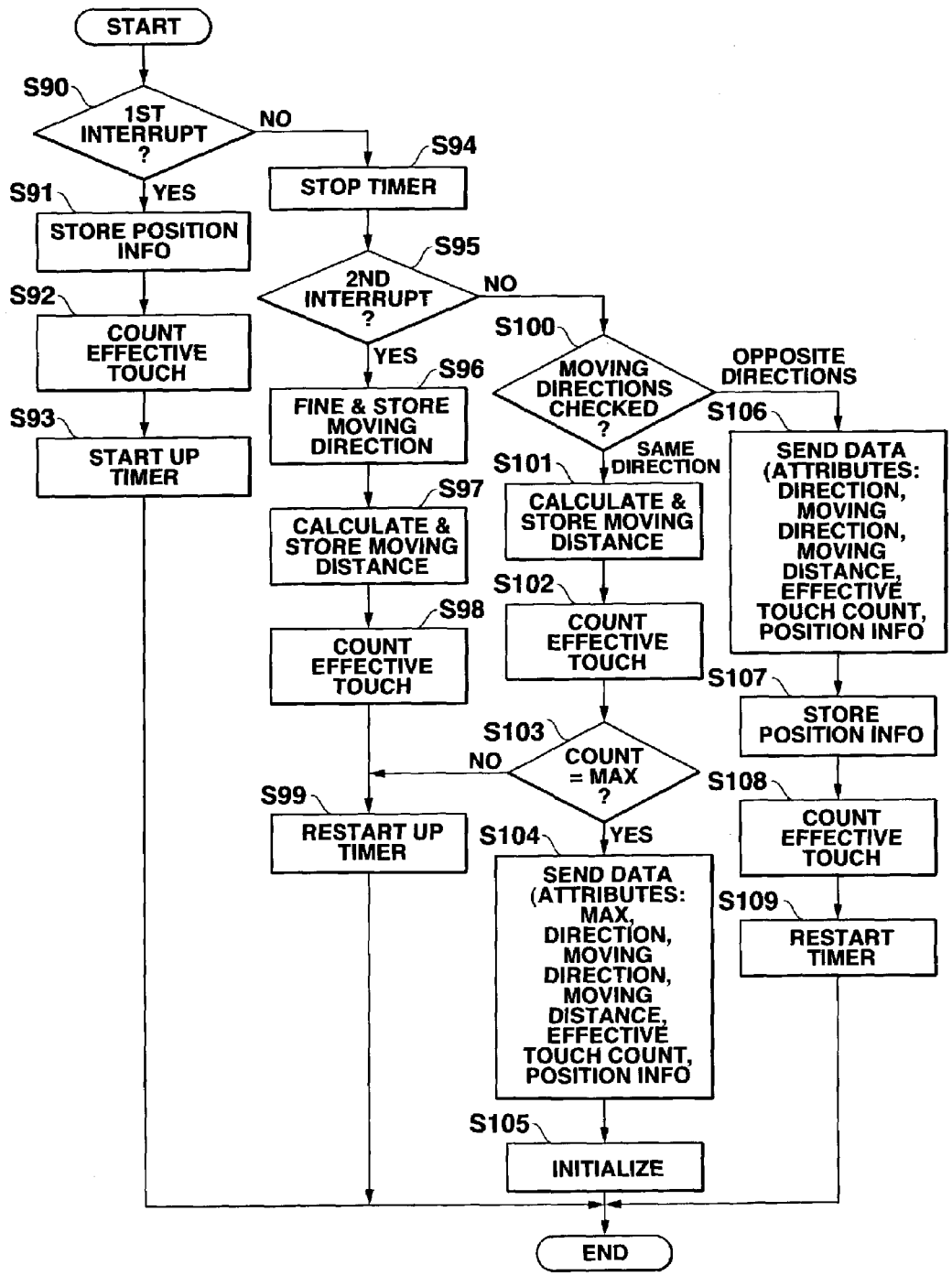
FIG. 26 is a flowchart of an operation of a touch count processor.

FIG. 26 is a flowchart of operation of the touch count processor 402. This flowchart starts up in response to an interrupt from the hardware part (the vertical or horizontal slide bar 400 or 401). When the touch count processor 402 senses an interrupt, it determines whether the interrupt is a first one (step S90). If so, it acquires information on the position of a touch (interrupt) performed on the vertical or horizontal slide bar 400 or 401, converts it to a corresponding value, stores it (step S91), counts an effective touch (step S92), and then starts up a timer (not shown) (step S93).

If the touch is a second or subsequent one, the timer that has been operated since the first touch was sensed stopped (step S94). The touch count processor 402 then determines whether this sensing involves a second interrupt (step S95). If so, the touch count processor 402 finds the moving direction of the user's finger from the difference between the first and second (this time) touch positions on the vertical or horizontal slide bar 400 or 401, stores it (step S96), calculates the moving distance concerned, stores it (step S97), counts an effective sample (step S98), and then restarts up the timer (step S99).

Figure 27:
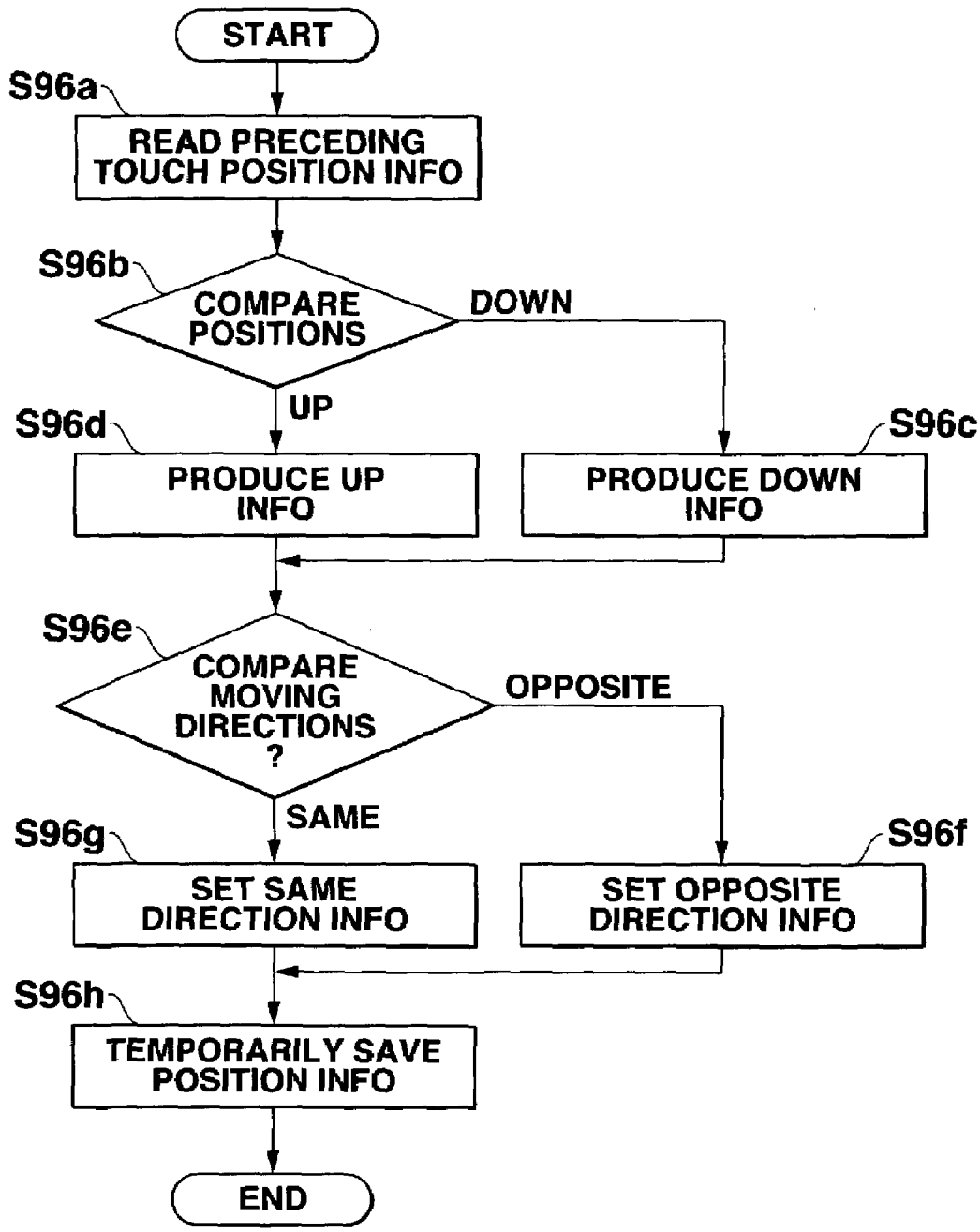
FIG. 27 is a flowchart of finding a moving direction.

FIG. 27 is a flowchart of finding the moving direction. In this flowchart, information on the preceding (first) touch position is read out (step S96a) and then compared to this-time touch position information (step S96b) to there by determine the moving direction of the user's finger on the vertical or horizontal slide bar 400 or 401. For example, if the preceding touch position is above the this-time touch position in the case of interrupt sensing on the vertical slide bar 400, a downward movement of the fingertip is determined to there by produce DOWN information (step S96c). If the inverse occurs, UP information is produced (step S96d). In the case of an interrupt from the horizontal slide bar 401, if the preceding touch position is on the right of the this-time touch position, a leftward movement of the finger is determined to thereby produce LEFT information. If the inverse occurs, RIGHT information is produced.

Then, the preceding moving direction is compared to the this-time moving direction (step S96e). If these moving directions are opposite to each other, opposite-direction information is set (step S96f). If they are the same, information on the same direction is set (step S96g). Such information is then stored temporarily (step S96h) and then the flowchart is closed. The moving distance is calculated as a difference between the last two interrupt positions. In the case of a third or subsequent touch, the moving direction is checked (step S100) in the flowchart of FIG. 27. If both the moving directions are the same, the moving distance is calculated and accumulated (step S101). When the accumulated effective touch count reaches a maximum value (count MAX) (steps S102, S103), the data stored in the touch count processor 402 at that time is sent to a key code converter 403 (step S104) and initialized (step S105). If it is determined that the moving directions are opposite to each other, the data obtained up to that time is sent to the key code converter 403 (step S106), the position information is stored (step S107), an effective touch is count is counted (step S108), and the timer is restarted (step S109).

Figure 28:
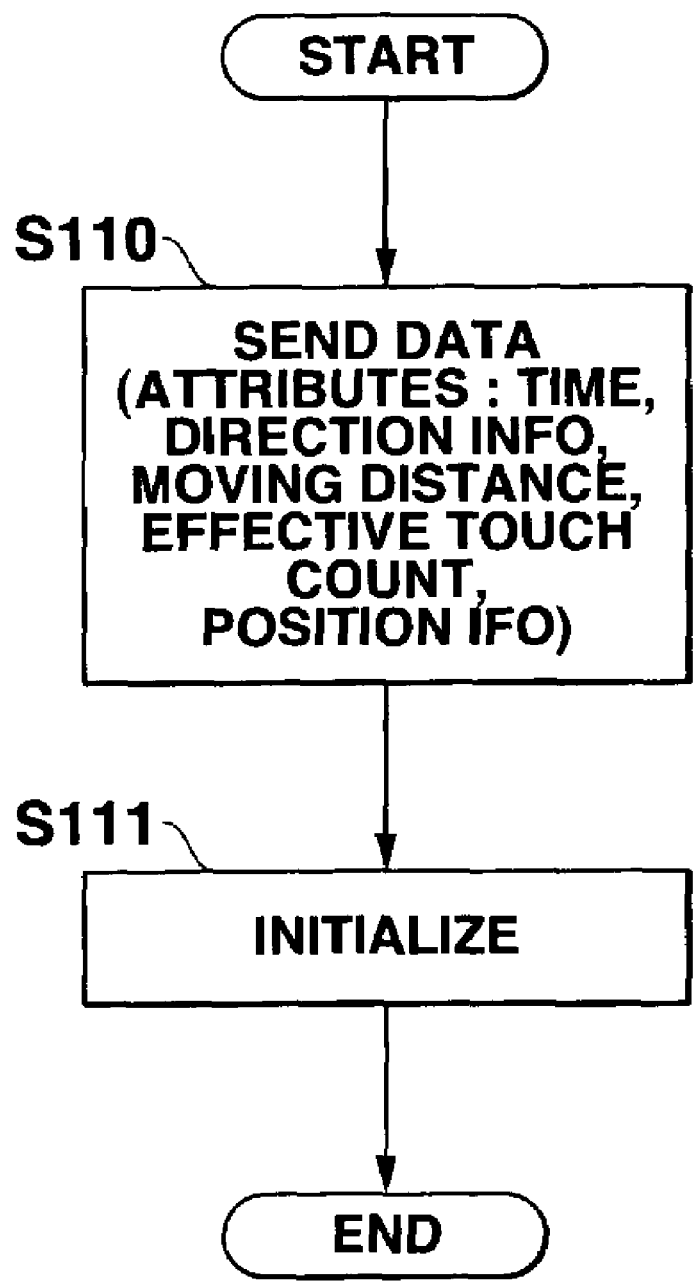
FIG. 28 is a flowchart of operation to be performed when a timer's time runs out.

FIG. 28 is a flowchart of operation to be performed when the timer's time has run out. The timer stops and restarts up in response to each interrupt.

When the timer's time has run out, data (on attributes, direction, distance, effective count, position, etc.) stored at that time is sent to the key code converter 403 (step S110) and then initialized (step S111).

Figure 29:
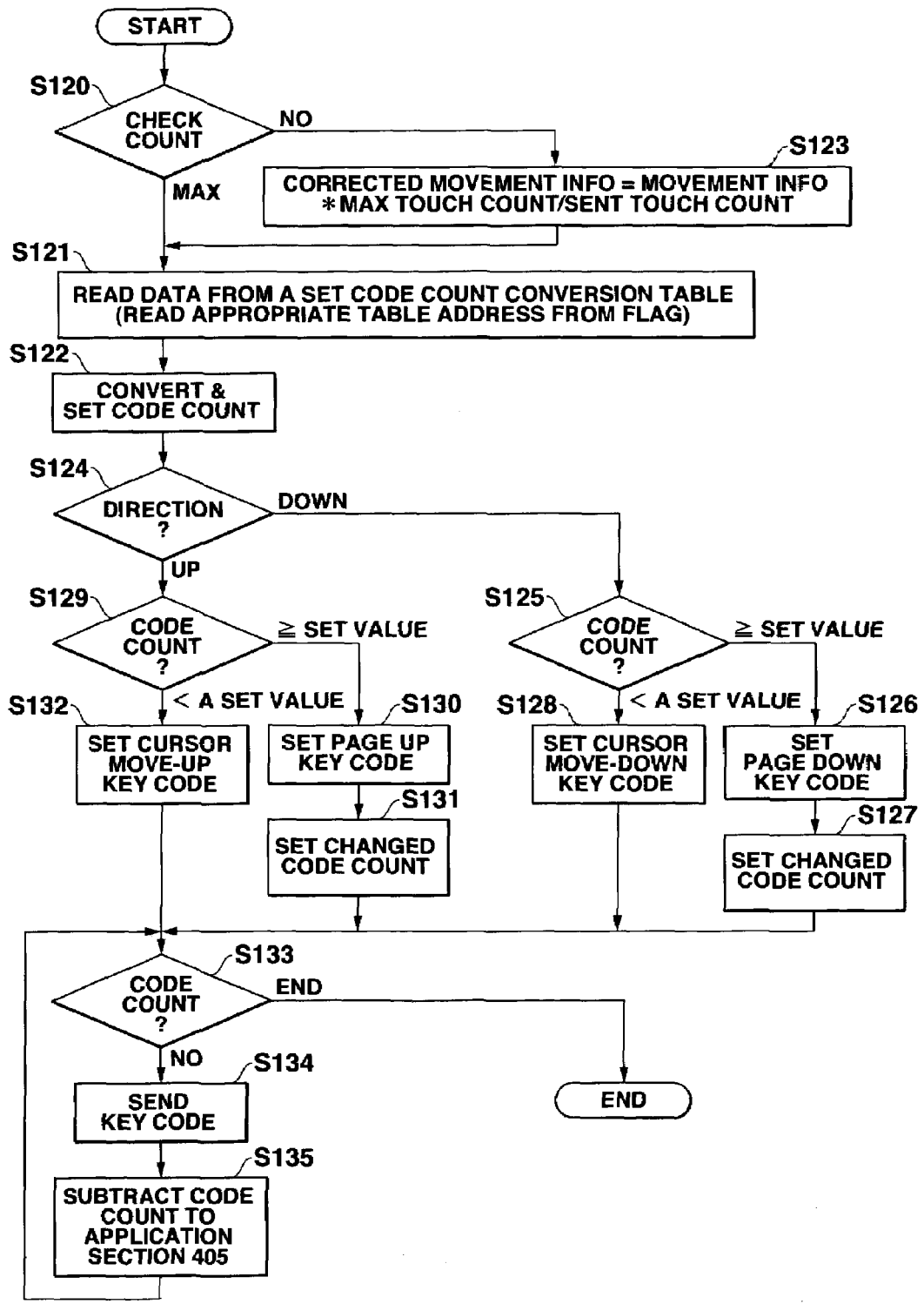
FIG. 29 is a flowchart of operation of a key code converter.

FIG. 29 is a flowchart of operation of the key code converter 403. This flowchart starts up in response to reception of data from the touch count processor 402. The key code converter 403 first checks the received data, and determines whether the data was sent by the touch count processor when the count MAX was detected ("YES" in step S103) or otherwise (step S120). In the case of the former or when the data was sent at the time of detection of the count MAX ("YES" in step S103), a code count that determines the moving speed of a picture displayed on the display device is converted based on the sent data and a table selected at present in the key code conversion table section 404 (steps S121, S122). If the data is sent in the latter instep S120, a count ratio (the count MAX÷the effective count included in the sent data) is calculated, the movement information is corrected based on the count ratio (step S123), the code count is converted based on the corrected data and the table selected at present in the key code conversion table section 404 (steps S121, S122).

Figure 30A:
FIGS. 30A and 30B each illustrate a table set in a key code conversion table section.
Figure 30B:
Figure 31:
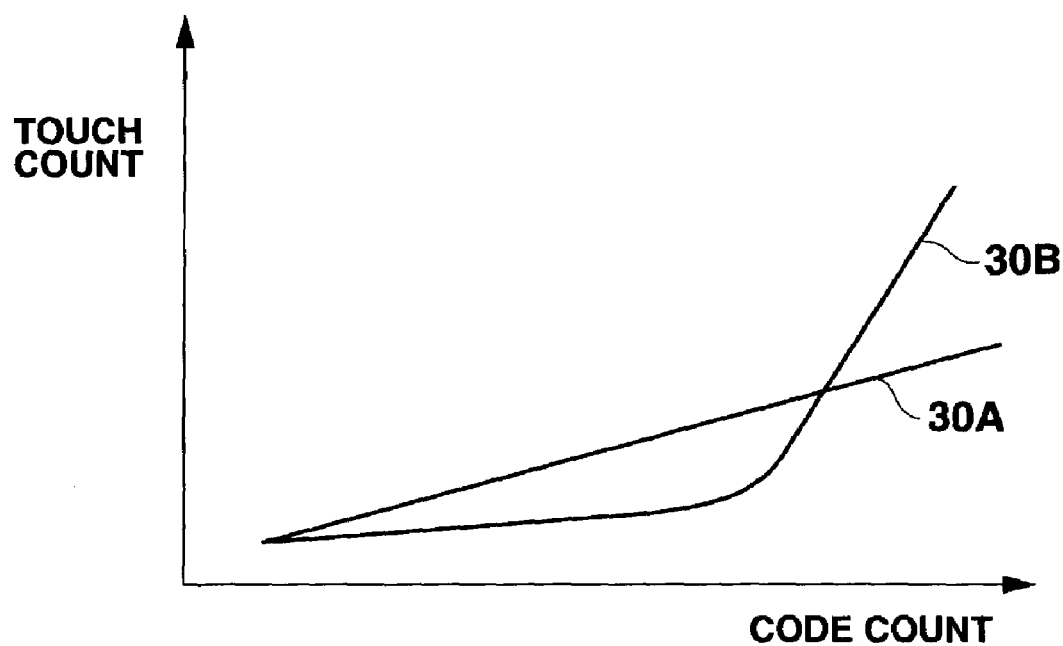
FIG. 31 illustrates characteristics of tables set in the key code conversion table section.

FIGS. 30A and 30B each illustrate a table set on the key code conversion table section 404. FIG. 30A shows a linear characteristic table where the moving distance and the code count change in directly proportional relationship. FIG. 30B shows a non-linear characteristic table. FIG. 31 shows the characteristics of the linear characteristic tables (30A) and the non-linear characteristic table (30B), which are typical of tables set in the key code conversion table section 404.

The linear characteristic table (30A) and non-linear characteristic table (30B) (if necessary, other tables) are respectively selected by a request from any one of application programs provided in the application section 405 positioned on a superordinate layer of the key code converter 403.

Figure 30C:
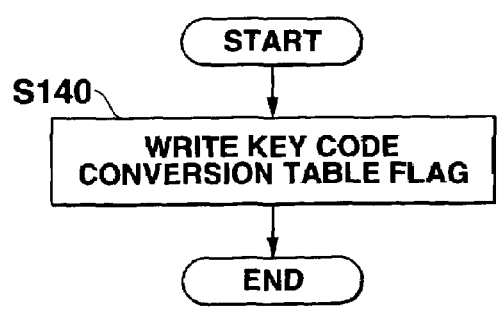
FIG. 30C is a flowchart of selecting a table in the key code conversion table section.

FIG. 30C is a flowchart of selecting one of the tables, which starts up in response to a request from any particular one of the application programs, writes a key code conversion table flag requested by the particular application program (step S140), and then terminates the flowchart.

Again, referring to FIG. 29, a basic key code is set based on the moving direction. For example, if the moving direction is upward or downward, information on the moving direction is first checked (step S124). If it is downward, it is then checked whether the code count is larger than a set value (step S125). If so, a key code for page jump down is set (step S126) and a changed code count is set (step S127). If not in step S125, a down cursor key code is set (step S128). If the moving direction is upward in step S124, it is determined whether the code count is more than the set value (step S129). If so, a key code for a page mump up is set (step S130) and a changed code count is set (step S131). If not in step S129, an up cursor key code is set (step S132). While in the illustration the upward and downward moving directions are illustrated as handled, the up- and down-down cursor key codes are replaced with the right and left cursor key codes when the moving directions are rightward and leftward.

The code count is then sent based on these information to the application section 405 (steps S133–S835). When the code count to be sent exceeds a predetermined value, it is converted by another key code conversion table to another code, which is then sent to the application section 405, in order to promote the movement of the picture.

In the present embodiment, any one of the key code conversion tables 404 is selected in response to a request from the application section 405. As described above, the key code conversion tables 404 include the linear characteristic table where the moving distance and the code count are in directly proportional relationship and the non-linear characteristic table, which, as shown in FIG. 30B, includes settings such as moving distance 1→code count 1, moving distance 2→code count 1, moving distance 3→code count 1, moving distance 4→code count 1, moving distance 5→code count 2, moving distance 6→code count 2 . . . , and moving distance 10→code count 15. In the case of the linear characteristic table , the code counts 1, 2, 3, . . . , 10 that are identical in numerical value to the moving distances 1, 2, 3, . . . , 10 are selected. In the case of the non-linear characteristic table, when the moving distance is smaller, a smaller code count is selected and as the moving distance increases, an increasing rapidly code count is selected. That is, when the linear characteristic table is selected, a code count corresponding to the quantity of slide sensed is set whereas when the non-linear characteristic table is selected, a code count increasing nonlinearly as the quantity of slide increases is set.

Therefore, according to this embodiment, for example, when a fine cursor movement or scroll operation is performed, the linear characteristic table is selected whereas when a larger cursor movement or scroll operation is performed, the non-linear characteristic table is selected. Therefore, a code count which will be produced at each request from the application section 405 can be changed for the same moving distance or slide quantity to thereby achieve a flexible key code producing function for each application.

Figures 32A, 32B:
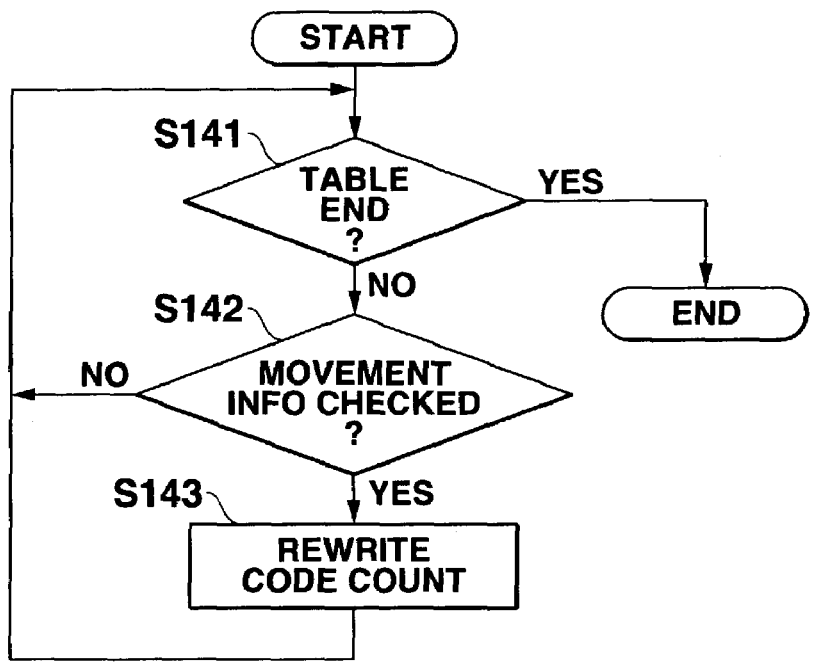
FIG. 32A is a flowchart of changing a code count in accordance with a request from an application section in a superordinate layer.
FIG. 32B illustrates tables present before and after their changing.

FIG. 32A is a flowchart of changing code count in response to a request from the application section 405 in the superordinate layer. This flowchart is constituted such that movement of a touch in its detection is checked (step S142) while changing a respective code count of the key code conversion table (step S143), and that when a table end is detected (step S141), control exits the looping operation.

FIG. 32B illustrates tables present before and after their changing. In this Figure, the respective code counts before their changing (old) present when the moving distances are 1, 2, 3, . . . , 10 are likewise 1, 2, 3, . . . , 10 whereas the respective code counts (new) obtained after their changing are 1, 1, 1, 4, 5, 7, . . . , 15.

Figure 33:
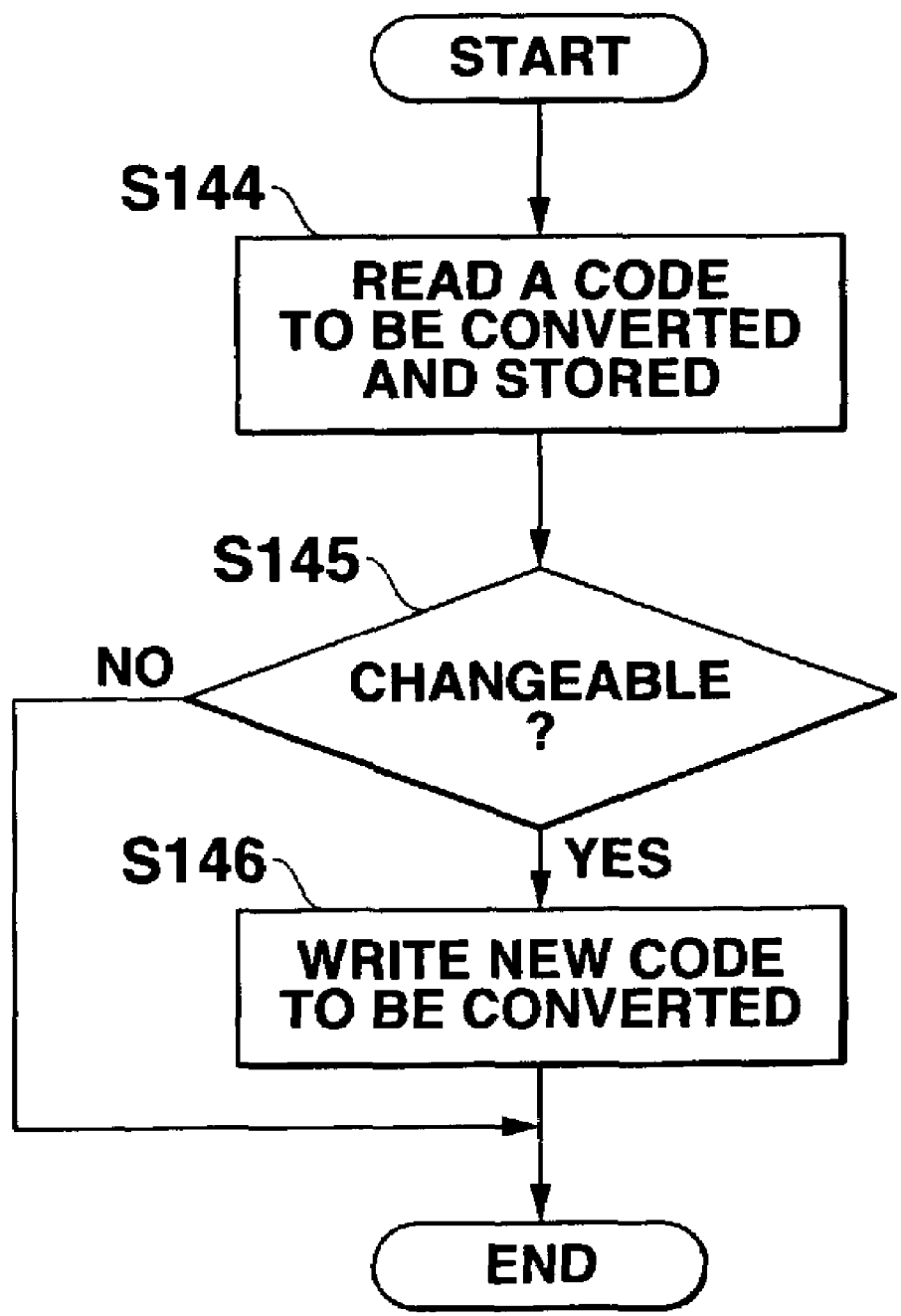
FIG. 33 is a flowchart of converting a key code to another in accordance with a request from the application section.

FIG. 33 shows a flowchart of converting a code to another key code in accordance with a request from the application section 405 in the key code converter 403. In this flowchart, a default key code to be converted and stored is read into the key code converter (step S144). When the key code converter 403 receives a request to convert a key code to another from the application section 405, it determines whether the code is changeable so as to satisfy the request (step S145). If so, anew relevant key code is written in (step S146). That is, only when a new request for a key code to be converted is made, a key code that satisfies the request is set.

As will be obvious from the above, according to this embodiment:

(1) Since the movement distance is calculated when a touch is detected, a quantity of scroll is easily increased to thereby perform a rapid scroll process;

(2) Since the code conversion is performed, the number of kinds of key codes can be reduced to thereby reduce the key process time in the supperordinate layer;

(3) Provision of a plurality of key code conversion tables allows a quantity of movement required by each application program to be changed easily; and (4) Since the code count and the key code are changeable, key event processes excluding a scroll are easily performed.

While in the key code converter 403 a quantity of movement to be corrected is illustrated as calculated from the count ratio (the count MAX÷the effective count included in the sent data), mentioned above, the quantity of movement may be corrected using another preset table. Alternatively, while it was illustrated in the key code converter 403 that the timer time expiration and detection of the opposite-direction movements are sensed simultaneously as the correcting condition, they may be sensed separately.

Figure 34:
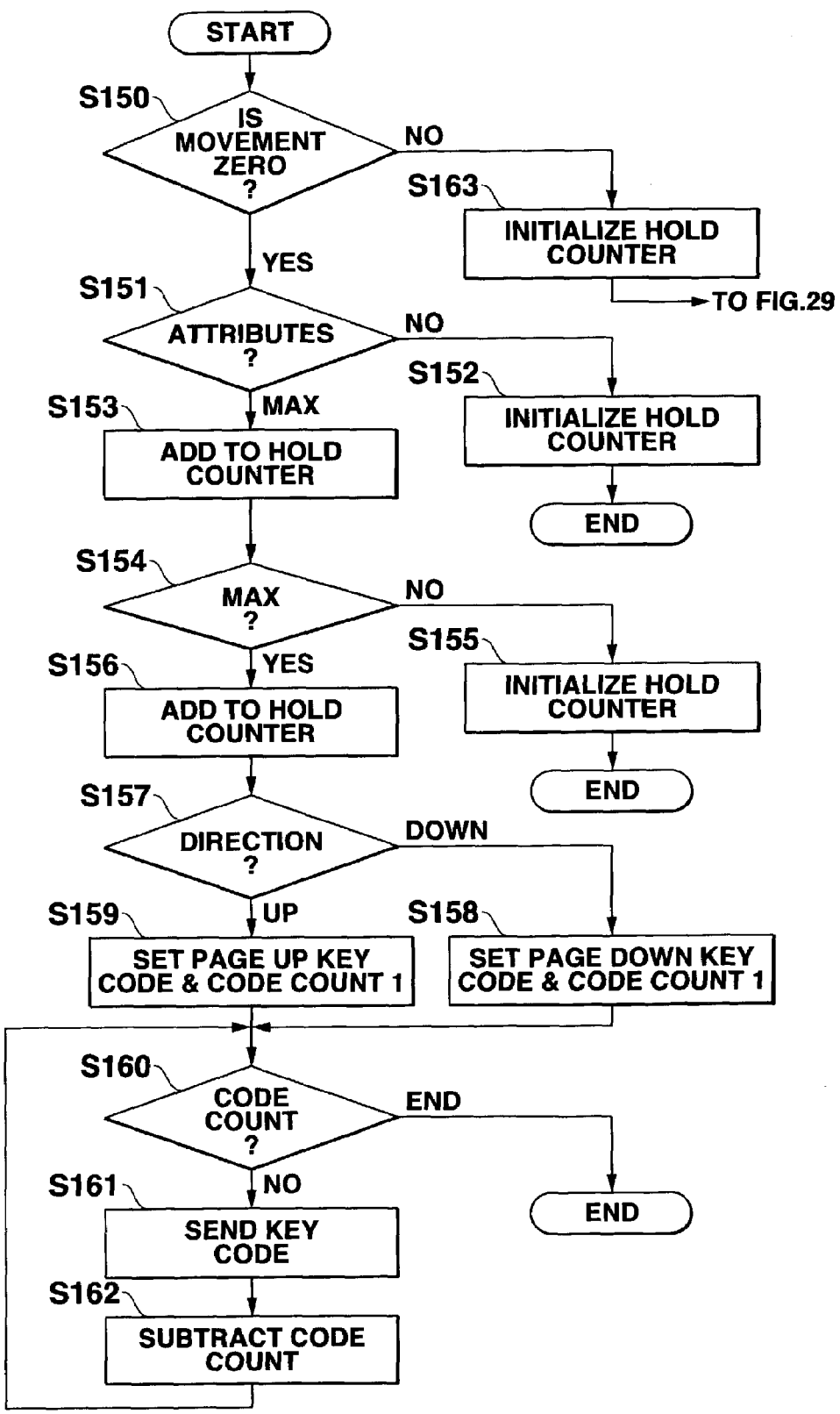
FIG. 34 is a preferable flowchart to be added before the flowchart of FIG. 29.

Before the flowchart of FIG. 29, a flowchart of FIG. 34 may be added. In the latter flowchart, it is determined whether the data received from the touch count processor 402 represents a zero quantity of movement (step S150). If so, added processes (step S151–S162) are performed. If the quantity of movement is not zero, a hold counter (not shown) is initialized (step S163) and then the process represented by the flowchart of FIG. 29 is performed. If the quantity of movement is zero and the effective touch count is MAX, the hold counter is set (step S153). If the count in the hold counter exceeds MAX, it is determined that the key continues to be depressed for a predetermined time (hold state) and that a required key code is produced and sent to the application section 405 in the superordinate layer. By a pattern analysis process for such data, the user is able to perform a slide operation as well as a hold operation.

While in the present embodiment the hold operation is determined, another pattern such as the tap operation may be determined.

What is claimed is:

1. A portable electronic apparatus comprising:
    a display device;
    a first touch sensor which extends vertically on a side of the display device, and a second touch sensor which extends horizontally on a side of the display device, each of the first and second touch sensors being adapted to sense a plurality of touch patterns;
    a memory which stores a plurality of data items;
    a selection section for selecting a mode of the apparatus as one of a selection mode for selecting one of the data items from the memory and a display/edit mode for at least one of displaying and editing the selected data item;
    an action controlling information memory which stores:
        (a) selection mode action controlling information which indicates an action to be taken when each of the plurality of touch patterns is input while the selection mode is selected, and (b) display/edit mode action controlling information which indicates an action to be taken when each of the plurality of touch patterns is input while the display/edit mode is selected; and
    a display control section which, when one of the touch patterns is sensed by at least one of the first touch sensor and the second touch sensor, reads out the action controlling information corresponding to the sensed touch pattern and the selected mode, and controls the display device in accordance with the read action controlling information.

2. The portable electronic apparatus according to claim 1, wherein each of the first and second touch sensors comprises a plurality of sensing devices.

3. The portable electronic apparatus according to the claim 2, wherein each of the plurality of sensing devices comprises a tact switch.

4. The portable electronic apparatus according to the claim 2, wherein each of the plurality of sensing devices comprises a static-induction touch switch.

5. The portable electronic apparatus according to the claim 2, further comprising:
    a sensing section which senses when at least two of the plurality of sensing devices are turned on successively in an order of arrangement thereof;
    a measuring section which measures a speed of the successive turning on of the at least two sensing devices; and
    a detecting section which identifies the successive turning on of the at least two sensing device as one of the touch patterns stored in the action controlling information memory based on the measured speed;
    wherein the display control section reads out the action controlling information corresponding to the identified touch pattern and the selected mode, and controls the display device in accordance with the read action controlling information.

6. The portable electronic apparatus according to the claim 5, wherein the action controlling information memory comprises:
    a first table in which the measured speed and a corresponding display moving speed of a display on the display device vary in a linear relationship; and
    a second table in which the sensed speed and the corresponding display moving speed vary in a non-linear relationship;
    wherein the display control section selects one of the first and second tables based on the measured speed, and controls the display device based on the selected table.

7. The portable electronic apparatus according to the claim 6, further comprising a rewriting section for rewriting at least one of the first table and the second table.

8. The portable electronic apparatus according to the claim 1, wherein the plurality of touch patterns comprise a single tap operation, a double tap operation and a scroll operation.

9. The portable electronic apparatus according to the claim 8, wherein the display device displays a scroll box; and
    the display control section moves a scroll thumb in the scroll box in accordance with sensing of the scroll operation.

10. The portable electronic apparatus according to the claim 8, wherein the first and second touch sensors are positioned such that the first and second touch sensors are operable by fingers of both hands of a user, when the user holds the apparatus with both hands.

11. A display control method for controlling an electronic apparatus comprising a display device, a memory which stores a plurality of data items, a first touch sensor which extends vertically on a side of the display device, and a second touch sensor which extends horizontally on a side of the display device, each of the first and second touch sensors being adapted to sense a plurality of touch patterns, said method comprising:
    selecting a mode of the apparatus as one of a selection mode for selecting one of the data items from the memory and a display/edit mode for at least one of displaying and editing the selected data item;
    sensing one of the touch patterns via at least one of the first and second touch sensors;
    accessing an action controlling information memory which stores: (a) selection mode action controlling information which indicates an action to be taken when each of the plurality of touch patterns is input while the selection mode is selected, and (b) display/edit mode action controlling information which indicates an action to be taken when each of the plurality of touch patterns is input while the display/edit mode is selected;
    reading the action controlling information corresponding to the sensed touch pattern and the selected mode; and controlling the display device in accordance with the read action controlling information.

12. The display control method according to claim 11, further comprising:

sensing successively activation of sensors of at least one of the first and second touch sensor along an arrangement direction of the sensors;

measuring a speed of the successive activation; and determining a touch pattern based on the measured speed.

13. The display control method according to claim 12, further comprising:

controlling a display moving speed of a display on the display device to be varied in one of a linear relationship with the measured moving speed and a non-linear relationship with the measured moving speed, based on the measured moving speed.

14. The display control method according to claim 11, wherein the plurality of touch patterns comprise a single tap operation, a double tap operation and a scroll operation.

* * * * *